(12) United States Patent
Zhang et al.

(10) Patent No.: US 10,139,198 B2
(45) Date of Patent: Nov. 27, 2018

(54) PHOTOELECTRIC SIGHTING SYSTEM AND CALIBRATION METHOD THEREOF

(71) Applicant: Huntercraft Limited, Albany, NY (US)

(72) Inventors: Lin Zhang, Albany, NY (US); Chunhua Shi, Albany, NY (US); Sang Su, Albany, NY (US)

(73) Assignee: HUNTERCRAFT LIMITED, Albany, NY (US)

(*) Notice: Subject to any disclaimer, the term of this patent is extended or adjusted under 35 U.S.C. 154(b) by 0 days.

(21) Appl. No.: 15/905,539

(22) Filed: Feb. 26, 2018

(65) Prior Publication Data

US 2018/0188004 A1    Jul. 5, 2018

Related U.S. Application Data

(63) Continuation-in-part of application No. 15/353,152, filed on Nov. 16, 2016.

(51) Int. Cl.

| | |
|---|---|
| *G06F 19/00* | (2018.01) |
| *F41G 1/34* | (2006.01) |
| *H04N 7/18* | (2006.01) |
| *H04N 5/33* | (2006.01) |
| *G02B 23/14* | (2006.01) |
| *H04N 5/232* | (2006.01) |
| *F41G 3/08* | (2006.01) |
| *F41G 3/06* | (2006.01) |

(52) U.S. Cl.
CPC ............ *F41G 1/345* (2013.01); *G02B 23/14* (2013.01); *H04N 5/33* (2013.01); *H04N 7/183* (2013.01); *F41G 3/065* (2013.01); *F41G 3/08* (2013.01); *H04N 5/23293* (2013.01)

(58) Field of Classification Search
CPC ................. F41G 3/08; F41G 1/38; F41G 3/06
USPC .......... 235/404, 407, 410, 416, 417
See application file for complete search history.

(56) References Cited

U.S. PATENT DOCUMENTS

| | | | |
|---|---|---|---|
| 6,456,497 B1* | 9/2002 | Palmer | B29C 66/12449 174/50.54 |
| 6,608,298 B2* | 8/2003 | Gaber | F41G 1/32 250/214 VT |
| 7,319,557 B2* | 1/2008 | Tai | F41G 1/32 359/350 |
| 9,689,644 B1* | 6/2017 | Zhang | F41G 3/06 |
| 2007/0035824 A1* | 2/2007 | Scholz | F41G 1/38 359/399 |
| 2012/0019700 A1* | 1/2012 | Gaber | H04N 5/332 348/311 |
| 2016/0231083 A1* | 8/2016 | Regan | F41G 1/38 |

* cited by examiner

*Primary Examiner* — Karl D Frech
(74) *Attorney, Agent, or Firm* — Novick, Kim & Lee, PLLC; Allen Xue

(57) ABSTRACT

A precise photoelectric sighting system that is simple in shooting calibration, quick and accurate in sighting, adapts to any environmental factor, and may greatly reduce the use of sensors and realize binocular sighting. The system includes a field-of-view acquisition unit, a display unit, a ranging unit and a sighting circuit unit; and precise shooting under any environment is realized by applying the integrated precise photoelectric sighting system. The calibration method of the photoelectric sighting system enables quick and precise calibration.

6 Claims, 13 Drawing Sheets

PHOTOELECTRIC SIGHTING SYSTEM AND CALIBRATION METHOD THEREOF

CROSS-REFERENCE TO RELATED APPLICATION

This application is a continuation in part application of U.S. patent application Ser. No. 15/353,152, filed on Nov. 16, 2016.

TECHNICAL FIELD

The present invention belongs to the technical field of sighting mirrors, and particularly relates to a photoelectric sighting system and a calibration method thereof.

BACKGROUND

Generally, traditional sighting devices are divided into mechanical sighting devices and optical sighting devices, wherein the mechanical sighting devices realize sighting mechanically via metal sighting tools, such as battle sights, sight beads and sights; and the optical sighting devices realize imaging with optical lenses to superpose a target image and a sighting line on the same focusing plane.

When the above two kinds of traditional sighting devices are applied to aimed shooting after the sighting tools are installed, accurate shooting can be accomplished by accurate sighting gesture and long-term shooting experience. However, for shooting beginners, inaccurate sighting gesture and scanty shooting experience may influence their shooting accuracy.

In the shooting process of the two kinds of traditional sighting devices, an impact point and a division center need to be calibrated multiple times to superpose; in the process of calibrating the impact point and the division center to superpose, a knob is adjusted multiple times or other mechanical adjustment is performed; and after the sighting device adjusted using the knob or adjusted mechanically is used frequently, the knob and other parts of the sighting device are worn, so that unquantifiable deviation is produced and the use of the sighting device is influenced.

When a large-sized complex photoelectric sighting system is applied to outdoor shooting, the photoelectric sighting system cannot accurately quantify environmental information due to such environmental factors as uneven ground, high obstacle influence, uncertain weather change and the like, and then cannot meet parameter information required by a complex trajectory equation, so diverse sensors are needed, such as a wind velocity and direction sensor, a temperature sensor, a humidity sensor and the like, and the large-sized complex photoelectric sighting system need to carry many sensor accessories and is difficult in ensuring the shooting accuracy in the absence of the sensors in the use environment.

At the moment, a simple model system having no need of various environmental factor parameters is needed to replace a trajectory model system requiring multiple environmental parameters. In the present invention, a shooting angle fitting method adapting to various environments without environmental parameters is studied out based on a sighting system of a gun itself in combination with physical science and ballistic science, to realize precision positioning of a photoelectric sighting system.

SUMMARY

To address the problems in the prior art, the present invention provides a precise photoelectric sighting system, which is simple in shooting calibration and quick and accurate in sighting, and can realize man-machine interaction, adapt to any environmental factor, greatly reduce the use of sensors and realize binocular sighting, as well as a calibration method thereof.

There is provided a photoelectric sighting system, including a shell, and the shell includes an internal space, a shell front end and a shell rear end;

wherein a field-of-view acquisition unit is installed at the shell front end and is configured to acquire information within a field-of-view; a display unit suitable for binocular viewing is installed at the shell rear end; and the information acquired by the field-of-view acquisition unit is transmitted to the display unit by a sighting circuit unit arranged in the internal space.

Further, the field-of-view acquisition unit is a day and night compatible lens, the internal space is provided with a low-illumination photoelectric conversion sensor, and the low-illumination photoelectric conversion sensor is arranged between the day and night compatible lens and the sighting circuit unit; and the day and night compatible lens is composed of a lens group, each lens in the lens group enables 95% to 100% of common visible light to pass through under a daytime lighting condition and can guarantee that the passing rate of near infrared light reaches 90% to 95% under a nighttime infrared light supplementation condition.

Further, the display unit is an OLED display screen.

Further, the exterior of the shell is provided with a focusing knob or a handle-type focusing handwheel, the interior of the focusing knob or the handle-type focusing handwheel is connected with the day and night compatible lens, and the knob or the handwheel is regulated according to the definition of an image under different distances, so that the image reaches the clearest state.

Further, a day and night switching control unit is arranged between the low-illumination photoelectric conversion sensor and the day and night compatible lens;

the day and night switching control unit includes an optical filter driving mechanism, a coil and a magnet; and a master control CPU circuit controls the generation of magnetic fields in different directions by controlling a flow direction of a current of the coil, and the magnet is controlled by the magnetic fields to drive the optical filter driving mechanism to act to make visible light or infrared light pass through an optical filter, so that the switching of day vision or night vision mode is realized.

Further, a human-computer interactive operation knob is arranged on the shell, the interior of the human-computer interactive operation knob is connected with the master control CPU circuit, and the human-computer interactive operation knob rotates to make the master control CPU circuit control the flow direction of the current of the coil according to a selected daylight or nightlight mode.

There is provided a calibration method of the photoelectric sighting system, including: setting a distance deviation in a parameter table and calculating an actual shooting impact point according to the distance deviation in the parameter table;

the setting a distance deviation in a parameter table includes: presetting N shooting distances, performing corresponding calculations to obtain a deviation corresponding to each preset shooting distance, recording each shooting distance and the deviation corresponding to it in the parameter table to finish the setting of the distance deviation in the parameter table; N is a natural number larger than 2; and the calculating an actual shooting impact point according to the distance deviation in the parameter table includes: during actual shooting, determining relationships between an actual shooting distance and shooting distances built in the parameter table, and calculating a deviation of the actual shooting distance according to the shooting distance and the deviation built in the parameter table to realize the calibration of an impact point for the actual shooting distance.

Further, the setting the distance deviation in the parameter table particularly includes:

without considering an influence of a shooting angle to a shooting deviation, respectively performing n times of shooting for each shooting distance in the parameter table, actually measuring coordinates of a target point and coordinates of an impact point, calculating a mean deviation of n times of shooting, and storing the mean deviation serving as a deviation of the corresponding shooting distances; and n is a natural number.

Further, the setting the distance deviation in the parameter table particularly includes: with considering an influence of a shooting angle to a shooting deviation, performing shooting for a certain shooting distance L1 in the parameter table many times, and calculating a mean deviation of n times of shooting according to the coordinates of the target point and the coordinates of the impact point; and calculating deviations generated after considering the influence of the shooting angle in combination with the shooting angle for other shooting distances in the parameter table, and taking the mean deviation generated after considering the influence of the shooting angle as a deviation of the corresponding distances built in the parameter table.

Further, a method for obtaining a deviation in the setting of the distance deviation in the parameter table can be realized by manually inputting a deviation of the target point and the impact point in vertical and horizontal directions after actually measuring the deviation;

or displaying field-of-view information by the display unit, aligning a center of a cross division line of the display unit to the target point after setting the target point, moving the center of the cross division line to the impact point after shooting, and storing and recording moved coordinates of the cross division line as the deviation.

Further, the calculating an actual shooting impact point according to the distance deviation in the parameter table particularly includes:

comparing an actual shooting distance S with each shooting distance built in a parameter table;

when the actual shooting distance is equal to a certain shooting distance built in the parameter table, directly reading a deviation of the shooting distance, and calibrating the impact point for the actual shooting distance;

when the actual shooting distance S is between two shooting distances $M_p$ and $M_q$ built in the parameter table, regarding the impact point between the point P and the point q, and calculating a deviation of the actual shooting distance S by using an equal-proportional calculation method; and when the shooting distance is beyond a range of the parameter table, requiring to consider influences brought by external factors, and calculating the deviation by using a multi-dimensional impact point deviation rectifying method to realize the calibration of the impact point for the shooting distance.

Further, the multi-dimensional impact point deviation rectifying method includes, a gravitational acceleration combined equal-proportional calculation method, a shooting pose based fitting method, a three-degree-of-freedom trajectory calculating method, and a six-degree-of-freedom trajectory calculating method.

Further, the gravitational acceleration combined equal-proportional calculation method is as follows: a corresponding transverse deviation is calculated in a transverse direction at an equal proportion, and a longitudinal deviation is calculated in a longitudinal direction by considering an influence of the gravity to a longitudinal displacement while proportional calculation is adopted.

Further, the shooting pose based fitting method is as follows: the deviation generated after the influence of a pitch angle is considered is calculated based on considering the influence of the pitch angle in a shooting pose to the impact point.

Further, the six-degree-of-freedom trajectory calculating method is as follows: six degrees of freedom include three degrees of freedom of a bullet mass center and three degrees of freedom rotating around the mass center based on regarding a bullet doing a spatial motion as a rigid body.

Further, the three-degree-of-freedom trajectory calculating method is as follows: a state of a bullet mass center in a three-dimensional space of x, y and z is only required to be considered in simplified calculation when a bullet doing a spatial motion is regarded as a rigid body.

The features of the present invention will be described in more details by combining the accompanying drawings in detailed description of various embodiments of the present invention below.

REFERENCE SYMBOL

1—shell; 12—battery compartment; 111—external socket slot, 2—shell rear end; 3—shell front end; 21—display unit; 31—field-of-view acquisition unit; 32—laser transmitting end; 33—laser receiving end; 34—lens cover; 41—CPU core board; 42—interface board; 43—battery pack; 01—low-illumination sensor circuit; 02—master control CPU circuit; 02-1—wifi module; 02-2—GPS module; 02-3—Bluetooth module; 03—display switching circuit; 04—OLED display screen; 05—focusing knob; 06—external device fixing seat; 07—human-computer interactive operation knob; 08—sighting mirror fixing seat; 011—day and night compatible lens; and 012—day and night switching control unit.

DETAILED DESCRIPTION

In order to make the purposes, technical solutions and advantages of the present invention clearer, the present invention will be further described in detail below in combination with the accompanying drawings and the embodiments. It should be understood that the specific embodiments described herein are merely used for interpreting the present invention, rather than limiting the present invention.

On the contrary, the present invention covers any substation, modification, equivalent method and solution defined by the claims within the essence and scope of the present invention. Further, in order to make the public better understand the present invention, some specific details are described below in the detail description of the present invention.

Embodiment 1

The present invention provides a shooting angle fitting method for an integrated precise photoelectric sighting system, the photoelectric sighting system may be installed on multiple types of sporting guns, e.g., rifles and the like, and the photoelectric sighting system may also be installed on pistols, air guns or other small firearms. When the photoelectric sighting system of the present invention is installed on a gun, it can be firmly and stably installed on an installation track or a reception device of the gun via an installer, the installer is of a known type of technology, the installer adopted in the present invention can adapt to the installation tracks or reception devices of different guns and can adapt to the different installation tracks or reception devices via an adjusting mechanism on the installer, and the photoelectric sighting system and the gun are calibrated by using a calibration method or calibration equipment for a gun and a sighting telescope after installation.

Figure 1:
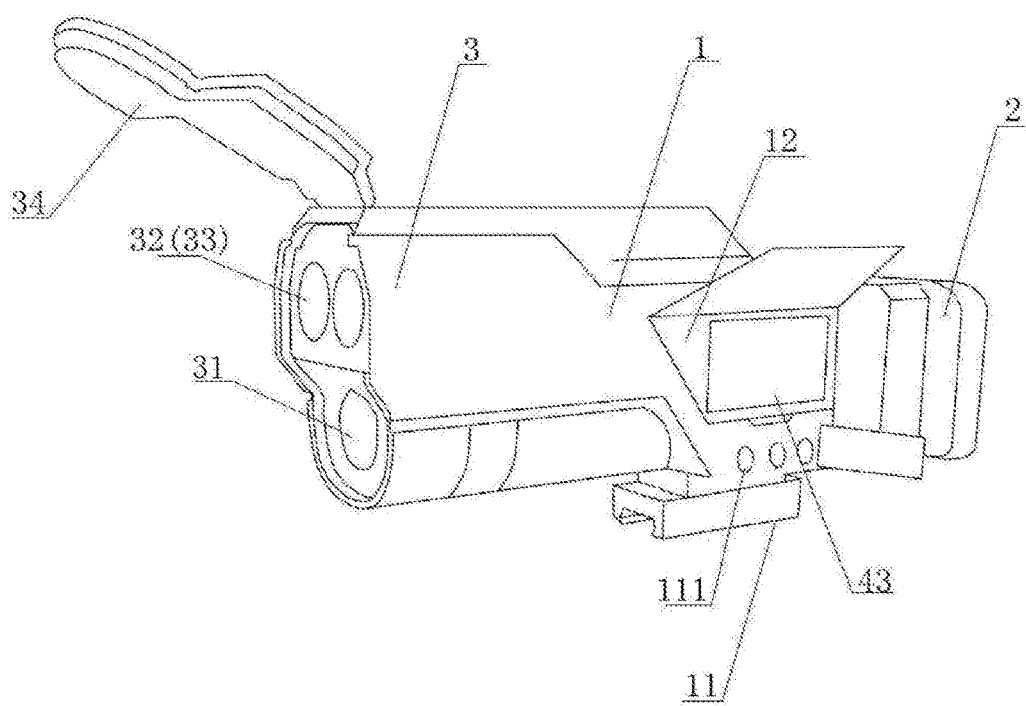
FIG. 1 is an appearance structural diagram of a photoelectric sighting system in an embodiment of the present invention.
Figure 2:
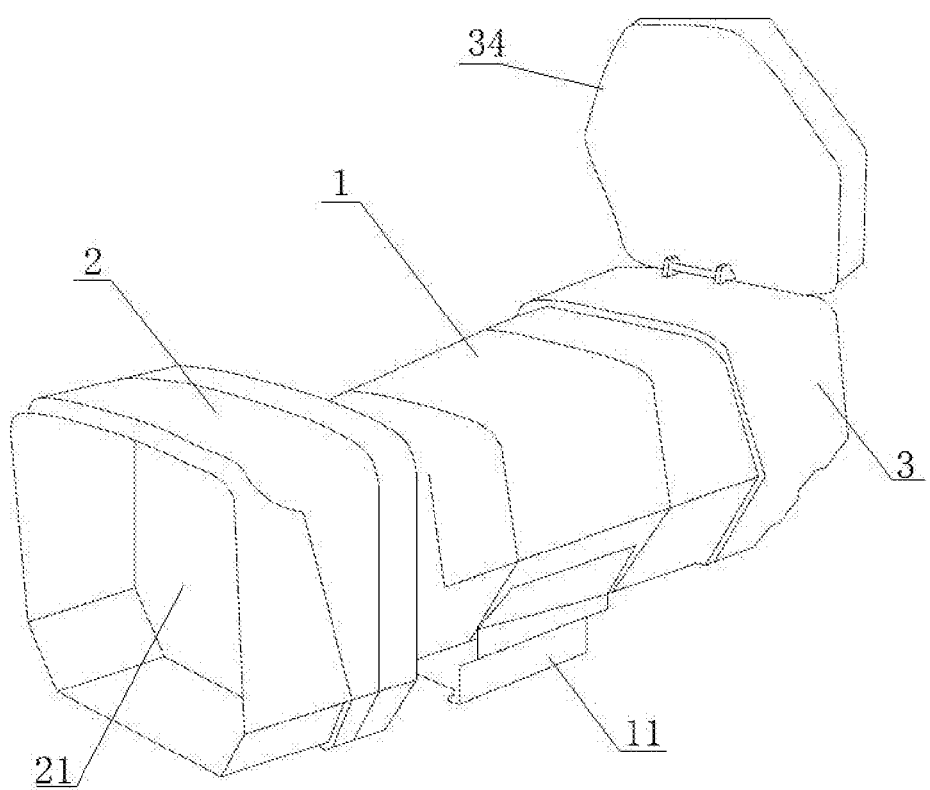
FIG. 2 is another appearance structural diagram of the photoelectric sighting system in an embodiment of the present invention.

FIG. 1 is an external structural schematic diagram of a photoelectric sighting system in an embodiment of the present invention, and FIG. 2 is another external structural schematic diagram of a photoelectric sighting system in an embodiment of the present invention. The photoelectric sighting system includes a shell 1, the shell 1 determines the size of the photoelectric sighting system and the size of circuits inside the shell 1, and the shell 1 defines an internal space for accommodating a field-of-view acquisition unit 31, a display unit 21 and even more components; meanwhile, the shell 1 includes a shell front end 3 and a shell rear end 2, particularly, the field-of-view acquisition unit 31 is installed at the front end, the field-of-view acquisition end of the field-of-view acquisition unit 31 is arranged inside the shell front end 3, the field-of-view acquisition unit 31 configured to acquire video information within the field-of-view, the display unit 21 is installed at the shell rear end, and the display unit 21 at least can simultaneously display the video information acquired by the field-of-view acquisition unit 31 and a cross division line for sighting; and the video information acquired by the field-of-view acquisition unit 31 is transmitted to the display unit via a sighting circuit unit arranged inside the shell.

The present invention adopts the structure with the shell front end and the shell rear end which can be separately replaced, and when a component of the photoelectric sighting system is damaged, the space where the component is correspondingly located and the shell can be replaced to repair the photoelectric sighting system, or the space where the component is correspondingly located and the shell are detached and the damaged component is separately replaced to repair the photoelectric sighting system.

In other embodiments, the display unit 21 may simultaneously display the video information acquired by the field-of-view acquisition unit 31, a cross division line for sighting, information for assisting shooting and functional information; the information for assisting shooting includes information acquired by sensors, such as distance information, horizontal angle information, vertical elevation information and the like; and the functional information includes functional menus, magnifying power adjustment, battery capacity, remaining record time and the like.

The field-of-view acquisition unit 31 includes an objective (objective combination) or other optical visible equipment with a magnifying function, which is installed at the front end of the field-of-view acquisition unit 31 to increase the magnifying power of the field-of-view acquisition unit.

The whole photoelectric sighting system may be a digital device, and can communicate with a smart phone, a smart terminal, a sighting device or a circuit and transmit the video information acquired by the field-of-view acquisition unit 31 to it; and the video information acquired by the field-of-view acquisition unit 31 is displayed by the smart phone, the smart terminal or the like.

In one embodiment, the field-of-view acquisition unit 31 may be an integrated camera, the magnifying power of the lens of the field-of-view acquisition unit 31 can be selectively changed according to practical application, the integrated camera adopted in the present invention is a 3-18X camera manufactured by Sony Corporation but is not limited to the above model and magnifying power, the integrated camera is arranged at the forefront of the photoelectric sighting system, meanwhile, a UV lens and a lens cover 34 are equipped at the front end of the integrated camera, and the lens cover 34 can turn over 270 degrees to completely cover the shell front end. Therefore, the field-of-view acquisition unit is protected from being damaged, and the lens is protected and is convenient to clean.

Figure 3:
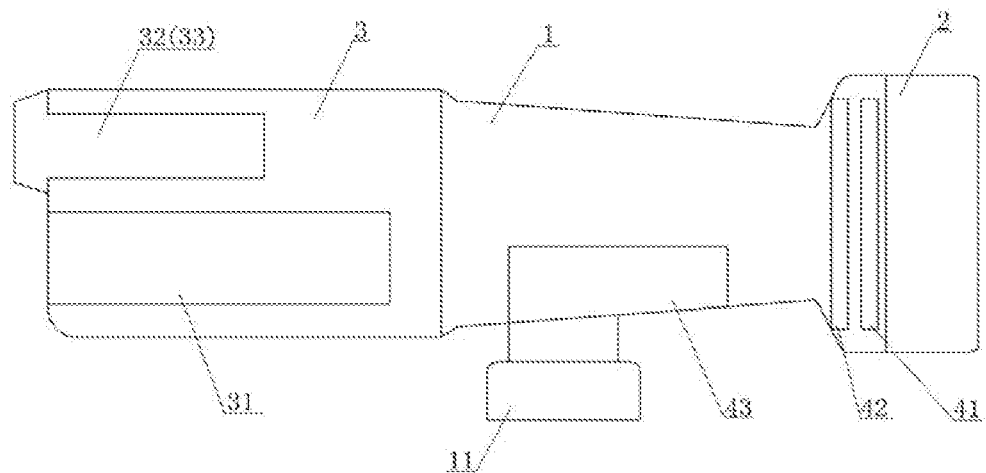
FIG. 3 is a structural section view of the photoelectric sighting system in an embodiment of the present invention.

As shown in FIG. 2 and FIG. 3, in the above embodiment, the photoelectric sighting system includes a range finder, the range finder is a laser range finder, and the laser range finder is located inside the shell 1 and is a pulse laser range finder.

Figure 4:
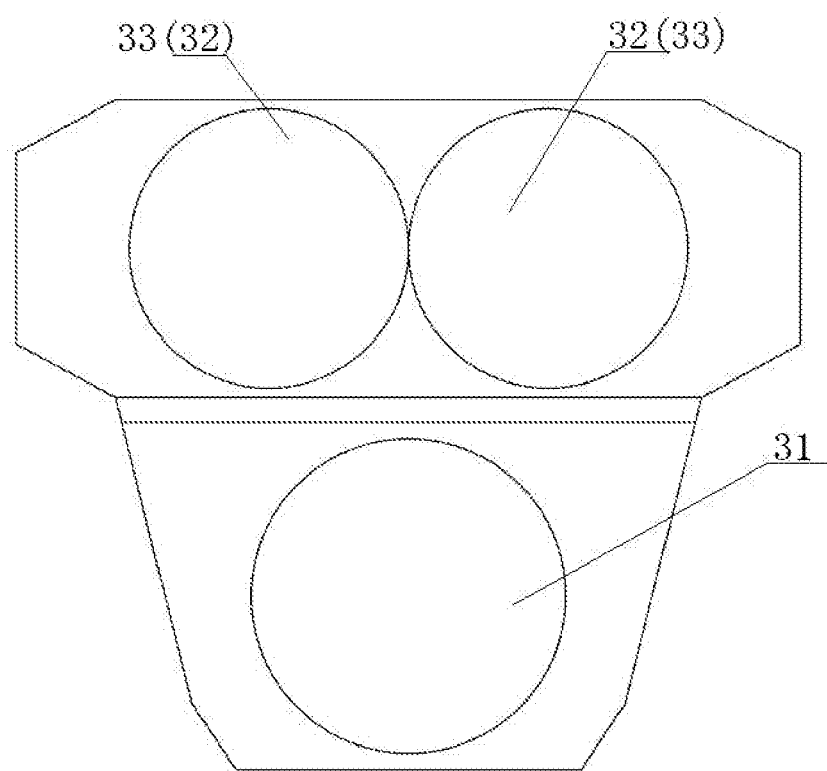
FIG. 4 is a schematic diagram of a shell front end of the photoelectric sighting system in an embodiment of the present invention.

As shown in FIG. 4, the laser range finder includes a laser transmitting end 32 and a laser receiving end 33 which are arranged at the front end of the shell 1 and symmetrically distributed on the camera of the integrated camera, and the laser transmitting end 32, the laser receiving end 33 and the camera of the integrated camera constitute an equilateral inverted triangle or an isosceles inverted triangle; both the laser transmitting end 32 and the laser receiving end 33 protrude from the front end of the shell 1, the laser transmitting end 32, the laser receiving end 33 and the lens of the field-of-view acquisition unit 31 have certain height difference, and the laser transmitting end 32 and the laser receiving end 33 protrude from the shell front end 3, and such a design reduces the shell internal space occupied by the laser range finder; the overlong parts of the laser transmitting end 32 and the laser receiving end 33 protrude from the shell front end 3 to realize high integration of the internal space of the shell 1, so that the photoelectric sighting system is smaller, more flexible and lighter; in addition, because the objective thickness of the field-of-view acquisition unit is generally higher than the lens thicknesses of the laser transmitting end and the laser receiving end, this design can reduce the error of laser ranging.

The lens cover 34 proposed in the above embodiment simultaneously covers the front end of the laser range finder while covering the field-of-view acquisition unit, thereby protecting the laser range finder from being damaged.

A laser source is arranged in the laser transmitting end 32, the laser source transmits one or more laser beam pulses within the field-of-view of the photoelectric sighting system under the control of a control device or a core board of the photoelectric sighting system, and the laser receiving end 33 receives reflected beams of the one or more laser beam pulses and transmits the reflected beams to the control device or the core board of the photoelectric sighting system; the laser transmitted by the laser transmitting end 32 is reflected by a measured object and then received by the laser receiving end 33, the laser range finder simultaneously records the round-trip time of the laser beam pulse, and half of the product of the light velocity and the round-trip time is the distance between the range finder and the measured object.

The sighting circuit unit arranged in the shell 1 and used for connecting the field-of-view acquisition unit 31 with the display unit 21 includes a CPU core board 41 and an interface board 42, the interface board 42 is connected with the CPU core board 41, particularly, the input/output of the CPU core board 41 is connected via a serial port at the bottom of the interface board 42, and the CPU core board 41 is arranged on one side of a display screen of the display unit 21 facing the interior of the shell 1; the interface board 42 is arranged on one side of the CPU core board 41 opposite to the display screen; the display screen, the CPU core board 41 and the interface board 42 are arranged in parallel; the integrated camera and the range finder are separately connected to the interface board 42 by connecting wires; the image information acquired by the integrated camera and the distance information acquired by the range finder are transmitted to the CPU core board 41 via the interface board 42, and the information is displayed on the display screen via the CPU core board 41.

The CPU core board 41 can be connected with a memory card via the interface board 42 or directly connected with a memory card, in the embodiment of the present invention, a memory card slot is formed at the top of the CPU core board 41, the memory card is inserted into the memory card slot, the memory card can store information, the stored information can be provided to the CPU core board 41 for calculation based on the shooting angle fitting method, and the memory card can also store feedback information sent by the CPU core board 41.

A USB interface is also arranged on the side of the memory card slot at the top of the CPU core board 41, and the information of the CPU core board 41 can be output or software programs in the CPU core board 41 can be updated and optimized via the USB interface.

The photoelectric sighting system further includes a plurality of sensors, particularly some or all of an acceleration sensor, a wind velocity and direction sensor, a geomagnetic sensor, a temperature sensor, an air pressure sensor and a humidity sensor (different sensor data can be acquired according to the selected shooting angle fitting method).

In one embodiment, the sensors used in the photoelectric sighting system only include an acceleration sensor and a geomagnetic sensor.

A battery compartment 12 is also arranged in the shell 1, a battery pack 43 is arranged in the battery compartment 12, a slide way is arranged in the battery compartment 12 to facilitate plugging and unplugging of the battery pack 43, the battery compartment 12 is arranged at the bottom of the middle part in the shell 1, and the battery pack 43 can be replaced by opening a battery compartment cover from the side of the shell 1; in order to prevent tiny size deviation of batteries of the same model, a layer of sponge (or foam or expandable polyethylene) is arranged inside the battery compartment cover; and the sponge structure arranged inside the battery compartment cover can also prevent instability of the batteries due to the shooting vibration of a gun.

A battery circuit board is arranged on the battery pack 43, the battery pack 43 supplies power to the components of the photoelectric sighting system via the battery circuit board, and the battery circuit board is simultaneously connected with the CPU core board 41 via the interface board 42.

External keys are arranged on one side close to the display unit 21 outside the shell 1 and connected to the interface board 42 via a key control board inside the shell 1, the information on the display unit 21 can be controlled, selected and modified by pressing the external keys, and the external keys are particularly at 5-10 cm close to the display unit.

Moreover, the external keys are particularly arranged on the right side of the display unit, but not limited to said position and should be arranged at the position facilitating use and press of a user, the user controls the CPU core board 41 via the external keys, the CPU core board 41 drives the display screen to realize display, and the external keys can control the selection of one shooting target within an observation area displayed by the display unit, or control the photoelectric sighting system to start the laser range finder, or control a camera unit of the photoelectric sighting system to adjust the focal distance of the sighting telescope, etc.

In another embodiment, the key control board for the external keys may be provided with a wireless connection unit and is connected with an external device via the wireless connection unit, the external device includes a smart phone, a tablet computer or the like, and then the external device loads a program to control the selection of one shooting target within the observation area displayed by the display unit, or control the photoelectric sighting system to start the laser range finder, or control the camera unit of the photoelectric sighting system to adjust the focal distance of the sighting telescope, etc.

An external socket slot 111 is also formed on the outer side of the shell 1, and the part of the external socket slot 111 inside the shell is connected with the key control board as a spare port, so that the external keys are used according to user demands, and a user can control the selection of one shooting target within the observation area displayed by the display unit 2, or control the photoelectric sighting system to start the laser range finder, or control the camera unit of the photoelectric sighting system to adjust the focal distance of the sighting telescope, or the like via the external keys.

The external socket slot 111 can also be connected with other operating equipment, auxiliary shooting equipment or video display equipment or transmit information and video, and the other operating equipment includes an external control key, a smart phone, a tablet computer, etc.; in one embodiment, the operating equipment connected with the external socket slot 111 may select one target within the observation area, start the laser range finder, adjust the focal distance of the sighting telescope or the like.

The display unit 21 is an LCD display screen on which a touch operation can be realized, and the size of the display screen can be determined according to actual needs and is 3.5 inches in the present invention.

In one embodiment, the resolution of the LCD display screen is 320*480, the working temperature is −20±70° C., the backlight voltage is 3.3 v, the interface voltage of the liquid crystal screen and the CPU is 1.8 v, and the touch screen is a capacitive touch screen.

The cross division line (sight bead) displayed on the display screen is superposed with the video information acquired by the field-of-view acquisition unit, the cross division line is used for aimed shooting, and the display screen also displays auxiliary shooting information used for assisting shooting and transmitted by the above sensors and working indication information.

One part of the shooting assisting information is applied to a shooting angle fitting method, while the other part is displayed for reminding a user.

The photoelectric sighting system may further include one or more ports and a wireless transceiving unit, which may communicate with a smart phone or other terminal equipment by wired or wireless connection.

Based on the structure of the photoelectric sighting system above, the CPU core board 41 is further connected with a memory card in which a bullet information database, a gun shooting parameter table and a shooting angle fitting method are set; and a user can call the gun shooting parameter table according to the used gun to acquire corresponding gun parameter information, call the bullet information database according to the used bullet to acquire corresponding bullet parameter information, and realize precise positioning of the photoelectric sighting system by adopting the shooting angle fitting method. The bullet information database needs to be called in other embodiments, but not called in the embodiments of the present invention.

In the present invention, a shooting angle fitting method adapting to various environments without environmental parameters is studied out based on a sighting system of a gun itself in combination with physical science and ballistic science, to realize accurate positioning of a photoelectric sighting system.

The sighting principle of a gun is actually the rectilinear propagation principle of light; because the bullet is subjected to gravity during flying, the position of an impact point is necessarily below the extension line of the gun bore line; according to the rectilinear propagation principle of light, the sight bead, the sight and the target point form a three-point line, a small included angle is thus formed between the connecting line between the sight bead and the sight and the trajectory of the bullet, and the crossing point of the included angle is the shooting starting point of the bullet, so the sight is higher than the sight bead. Each model of gun has its own fixed shooting parameter table, the parameter table records height parameter values of the sight bead and the sight under different distances, and the target can be accurately hit only if the corresponding parameters of the sight bead and the sight are adjusted under different shooting distances.

In one embodiment, the shooting angle fitting method describes a deviation matching fitting algorithm based on a shooting angle.

Specific parameters of the gun used by the user are determined in the gun shooting parameter table, the following formulas are all derived taking horizontal shooting (i.e., the bore extension line is perpendicular to the target plane during shooting) as an example, and downward shooting or overhead shooting is deduced according to the following deduction logics. The shooting distance is accurately measured by the ranging unit in the photoelectric sighting system. When the target shooting distance is M, the same target is shot n (n>=1) times, and n times of shooting accumulated deviation X of the impact point in the horizontal direction (transverse) from the target point and n times of shooting accumulated deviation Y of the impact point in the vertical direction from the target point are obtained by the following formulas:

$$X = \Sigma_{i=0}^{n} X_i \quad (1)$$

$$Y = \Sigma_{i=0}^{n} Y_i \quad (2)$$

wherein $X_i$ represents deviation of the impact point in the horizontal direction from the target point in $i^{th}$ shooting;

$Y_i$ represents deviation of the impact point in the vertical direction from the target point in $i^{th}$ shooting.

The mean deviations of the shot impact point in the horizontal direction and the vertical direction from the target point are obtained:

$$\overline{x_i} = \frac{X}{n} \quad (3)$$

$$\overline{y_i} = \frac{Y}{n} \quad (4)$$

wherein $\overline{x_i}$ represents the mean deviation of the impact point in the horizontal direction from the target point in the $i^{th}$ shooting;

wherein $\bar{y}_i$ represents the mean deviation of the impact point in the vertical direction from the target point in the $i^{th}$ shooting.

Figure 5:
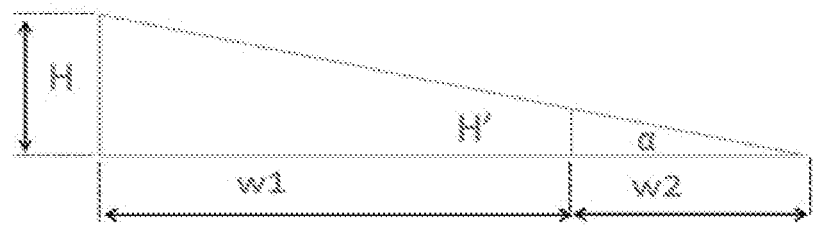
FIG. 5 is a schematic diagram of a gun sighting parameter corresponding relation of the photoelectric sighting system in an embodiment of the present invention.

As shown in FIG. 5, a bullet information database, a gun shooting parameter table and a shooting angle fitting method are set in the memory card; and according to the built-in gun sighting parameter table set in the factory and the model of the gun used, the following parameters can be obtained: sight height H, sight bead height H', distance w1 between the sight and the sight bead, and distance w2 between the sight bead and the muzzle.

1) The included angle $\alpha$ between the barrel axis of a gun used by a user and a sighting line is calculated.

Calculated according to the approximate triangle principle is:

$$H'/H = w2/(w1+w2) \quad (5)$$

Obtained is:

$$w1+w2 = H*w2/H' \quad (6)$$

Wherein $$w2 = (w1*H')/(H-H') \quad (7)$$

Obtained is:

$$\tan \alpha = (H-H')/w1 \quad (8)$$

2) The included angle $\beta$ between the bore extension line of the gun used by the user and the optical axis of the sighting mirror under the shooting distance M is calculated.

Figure 6:
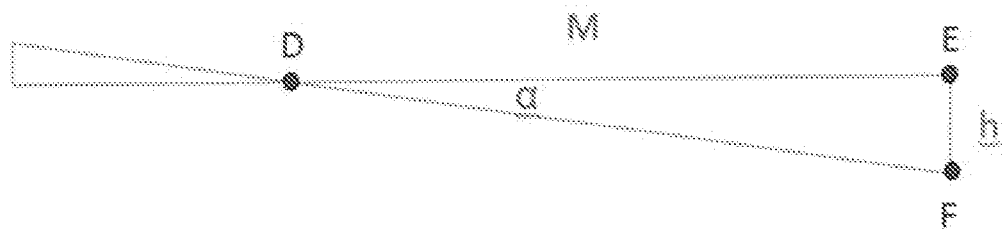
FIG. 6 is a schematic diagram of diagonal triangles constituted by connection lines of a sight, a sighting line and a bore extension line of a gun and a target object in an embodiment of the present invention.

As shown in FIG. 6, the connection lines of the sight, the sighting line, the bore extension line and the target object constitute diagonal triangles, and then the following formula can be obtained:

$$h = \tan \alpha * M \quad (9)$$

Figure 7:
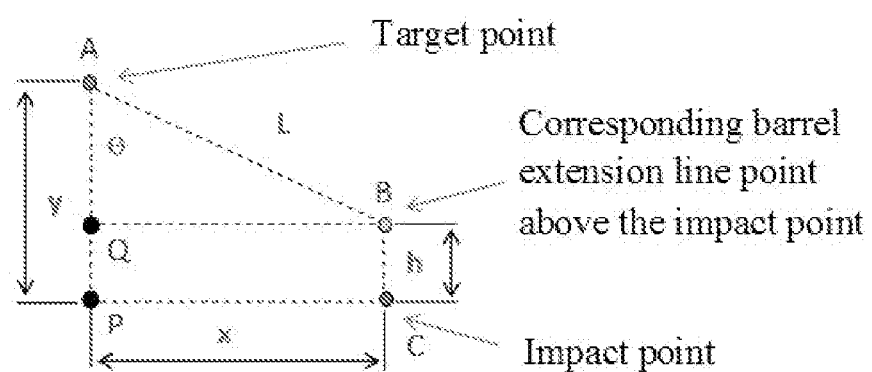
FIG. 7 is a schematic diagram of a plane formed by a target point, an impact point and a barrel extension line of the photoelectric sighting system in an embodiment of the present invention.

As shown in FIG. 7, by calculating the impact point C of n (n>=1) times of shooting and ignoring the effect of environmental factors in the horizontal direction, the height h above the impact point is regarded as a barrel axis extension line point B. Within the target object plane, the figure is constituted by the connection lines of the intersection A of the optical axis of the sighting mirror and the target object plane, the intersection B of the bore extension line and the target object plane, the impact point C, the intersection Q of the vertical line passing the point A and the horizontal line passing the point B within the target plane, and the intersection P of the extension line of AQ and the horizontal line passing the point C. The point Q is the intersection of the central point of the optical axis of the sighting mirror in the vertical direction and the bore extension line in the horizontal direction, the point P is the intersection of the central point of the optical axis of the sighting mirror in the vertical direction and the impact point in the horizontal direction, and the distance L between the projection points of the optical axis center of the sighting mirror and the bore extension line on the target plane under the distance M is calculated via the actually measured horizontal deviation value distance x and vertical deviation value distance y after shooting:

$$L = \sqrt{(y-h)^2 + x^2} \quad (10)$$

Figure 8:
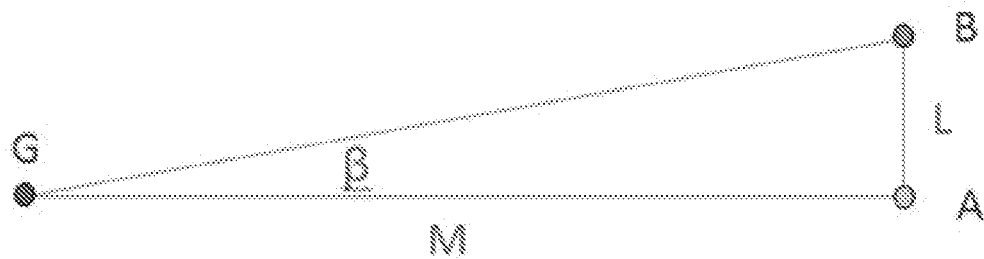
FIG. 8 is a schematic diagram of a right triangle constituted by the optical axis center of the photoelectric sighting system, the intersection of the optical axis on a target plane and the intersection of the barrel axis extension line on the target plane in an embodiment of the present invention.

As shown in FIG. 8, a right angle is constituted by connecting the optical axis center G of the sighting mirror, the intersection A of the optical axis on the target plane and the intersection B of the bore extension line on the target plane, and then it can be obtained:

$$\tan \beta = L/M \quad (11)$$

wherein L is the horizontal distance of the target object under the shooting distance M.

In combination with FIG. 7, AB and AQ form a fixed included angle θ within the target plane, the included angle is determined by the installation error, and according to the calculated deviation means $\bar{x1}$ and $\bar{y1}$, it can be obtained:

$$\theta = \arc\tan(\bar{x1}/(\bar{y1}-h)) \quad (12)$$

When the user selects different gun type, the sighting system can automatically select the sight height $H_x$, the sight bead height $H'_x$ and the horizontal distance w1x between the sight and the sight bead corresponding to the gun type in the built-in gun parameter table according to the gun type, and then the sighting angle $\alpha_x$ is calculated. As shown in FIG. 5, FIG. 6, FIG. 7 and FIG. 8, $L_x$ is the distance of the target object under the shooting distance $M_x$, and the horizontal distance $L_x$ under different distance $M_x$ is calculated:

$$L_x = \tan \beta * M_x \quad (13)$$

At the moment, the horizontal deviation x and the vertical deviation y of the target point and the actual impact point can be obtained:

$$x = \tan \beta * \sin \theta * M_x \quad (14)$$

$$y = \tan \beta * \cos \theta * M_x + ((H_x - H'_x)/w1) * M_x \quad (15)$$

Figure 9:
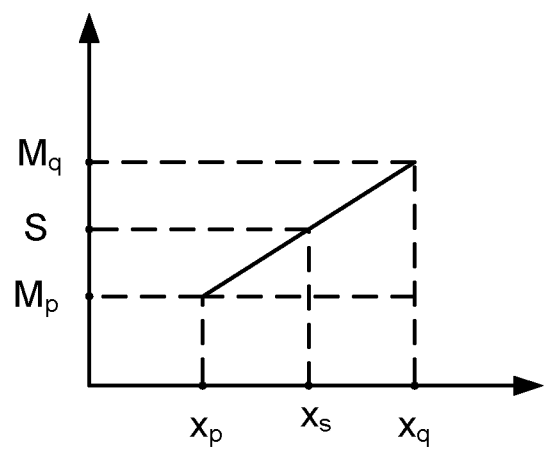
FIG. 9 is a schematic diagram of horizontal deviation of the impact point of the photoelectric sighting system in an embodiment of the present invention.
Figure 10:
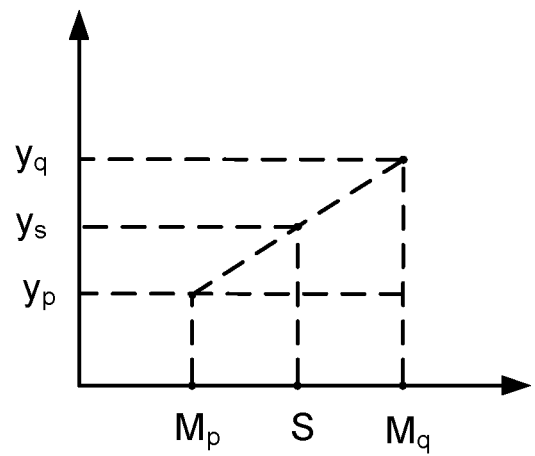
FIG. 10 is a schematic diagram of vertical deviation of the impact point of the photoelectric sighting system in an embodiment of the present invention.

According to the above deviation calculation formulas of x and y,

In combination with the built-in distance in the gun shooting parameter table as well as the sight height, the sight bead height and the horizontal distance between the sight bead and the sight under the distance, x and y deviation values under each fixed point distance are calculated and stored in the database; in the normal shooting process, the measured shooting distance is matched with the database one by one; if the distance is equal to a certain fixed point distance in the database, the deviation values are directly read; and if the distance S is between two fixed point shooting distances $M_p$ and $M_q$, the impact point under the distance S is regarded between the points p and q. FIG. 9 and FIG. 10 are respectively schematic diagrams of the horizontal deviation and the vertical deviation of the impact point, and the deviations can be calculated according to the following formulas:

$$x_s = (x_q - x_p)*(S - M_p)/(M_q - M_p) + x_p \quad (16)$$

$$y_s = (y_p - y_q)*(S - M_p)/(M_q - M_p) + y_p \quad (17)$$

wherein $x_p$ is the transverse deviation of the impact point at the point p, $x_q$ is the transverse deviation of the impact point at the point q, $y_p$ is the longitudinal deviation of the impact point at the point p, and $y_q$ is the longitudinal deviation of the impact point at the point q.

In another embodiment, the shooting angle fitting method describes a compensation fitting algorithm based on a shooting angle, which is imported based on the deviation matching fitting algorithm based on the shooting angle. The influence of gravitational acceleration is added to the compensation fitting algorithm based on a shooting angle, so that the aimed target is more accurate.

Figure 11:
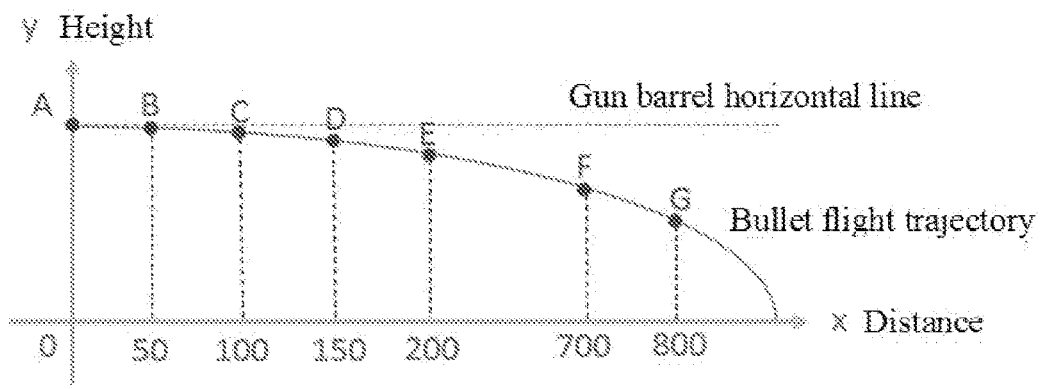
FIG. 11 is a schematic diagram of a bullet flight trajectory of the photoelectric sighting system in an embodiment of the present invention.

After the flight distance of the bullet exceeds M2, the drop height difference of the bullet is increasingly large due to the reduction of the velocity of the bullet and the action of the vertical acceleration, and the trajectory of the bullet is as shown in FIG. 11.

Figure 12:
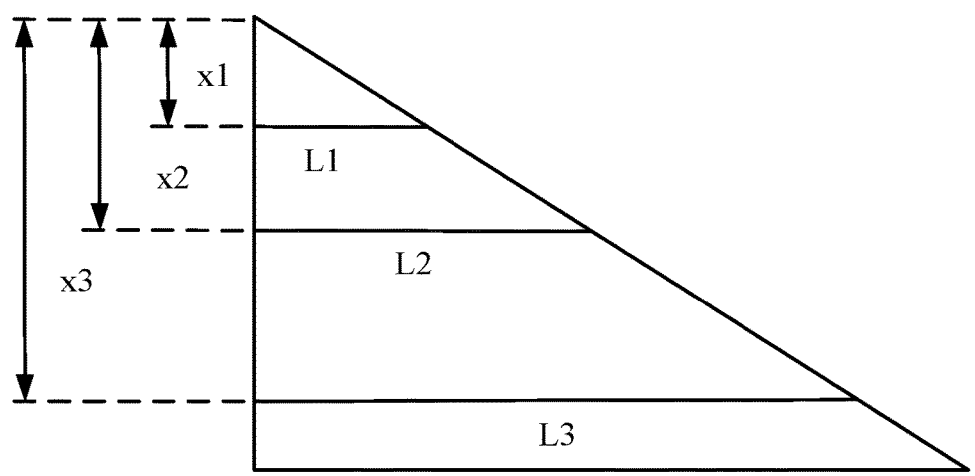
FIG. 12 is a schematic diagram of a relation between the horizontal deviation of the photoelectric sighting system and the target distance in an embodiment of the present invention.

As shown in FIG. 12, the sighting system needs to perform deviation compensation calculation on the impact point. Under the condition of ignoring the influence of environmental factors, the horizontal deviation is mainly determined by the installation error of the sighting mirror, and the installation error is fixed, so the horizontal deviation and the horizontal distance can be regarded as having a linear relation in calculation.

The flight trajectory can be decomposed into a horizontal distance and a vertical distance; it is supposed that $\overline{x_1}$ is horizontal deviation when the horizontal distance is L1, $\overline{x_2}$ is horizontal deviation when the horizontal distance is L2 and x3 is to-be-solved horizontal deviation fitted when the horizontal distance of the bullet at the target point is L3, and the calculation method is as follows:

$$x3=(L3/L1)*\overline{x_1}*X\_Coefficient \quad (18)$$

or $$x3=(L3/L2)*\overline{x_2}*X\_Coefficient \quad (19)$$

wherein X_Coefficient is a built-in horizontal adjustment coefficient injected before leaving the factory, and is related to the models and installation of the gun and bullets.

Figure 13:
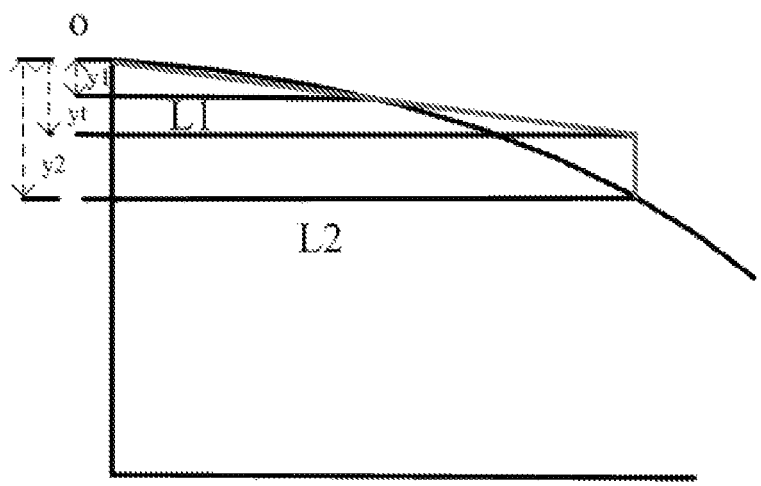
FIG. 13 is a schematic diagram of a position change relation when the bullet of the photoelectric sighting system flies from the horizontal distance L1 to the horizontal distance L2 in an embodiment of the present invention.
Figure 14:
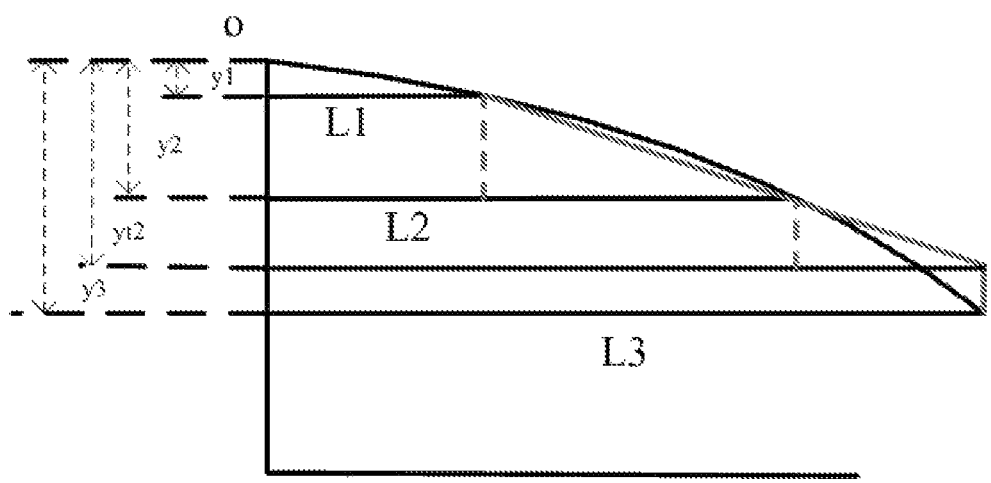
FIG. 14 is a schematic diagram of a position change relation when the bullet of the photoelectric sighting system flies from the horizontal distance L2 to the horizontal distance L3 in an embodiment of the present invention.

As shown in FIG. 13 and FIG. 14, the vertical deviation of the horizontal distance L3 is y3, and the vertical deviation includes actual fall after the bulletin flies the distance L2, and also includes inherent deviation from the horizontal distance L2 to the horizontal distance L3 and fall caused by superposing the gravitational acceleration, wherein the inherent deviation is a vertical component of the installation error; t is time when the bullet flies from the horizontal distance L1 to the horizontal distance L2, and v is velocity when the bullet arrives at the horizontal distance L2; because the flight distance of the bullet from the horizontal distance L1 to the distance L2 is very short, it is regarded that the velocity of the bullet from the horizontal distance L1 to the distance L2 is consistent, the influence of environmental factors is ignored; and g is gravitational acceleration. In the process of flying from the horizontal distance L1 to the distance L2, the vertical deviation of the bullet is only the deviation caused by the vertical installation error in the absence of gravity, and then when the bullet accomplishes the flight of the horizontal distance L2, its longitudinal impact point is at yt, and yt is between y1 and y2; and in the presence of gravitational acceleration, when the bullet accomplishes the flight of the horizontal distance L2, the longitudinal impact point is at y2, wherein the values of y1 and y2 are mean deviation values of the two calibration points. If the gravity is not considered when the bullet is at the horizontal distance L1, the bullet only arrives at yt in the vertical direction when flying the horizontal distance L2 under the action of only the angular deviation, and it can be obtained according to the triangle principle:

$$yt=\overline{y_1}*L2/L1 \quad (20)$$

Thus, the flight time calculation method from y1 to y2 is obtained as follows:

$$t=\sqrt{2*(y2-\overline{y_1}*L2/L1)/g} \quad (21)$$

$$v=(L2-L1)/t \quad (22)$$

It is supposed that h is deviation caused by gravity when the bullet flies from the horizontal distance L2 to the distance L3, yt2 is a longitudinal height deviation value of flight from the horizontal distance L2 to the distance L3 when only the inherent deviation is considered but the gravity is not considered, Y_Coefficient is a built-in longitudinal adjustment coefficient before equipment leaves the factory, and H_Coefficient is a built-in gravitational deviation adjustment coefficient before the equipment leaves the factory and is related to such factors as local latitude and the like. In the absence of gravity, when the bullet flies from the horizontal distance L2 to the distance L3, the longitudinal impact point thereof is at yt2; in the presence of gravitational acceleration, when the bullet accomplishes the flight of the horizontal distance L3, the longitudinal impact point is at y3; the bullet flies at a high speed within an effective range; by ignoring the influence of environment, it is regarded that the bullet flies uniformly from the horizontal distance L2 to the distance L3, the velocity is the bullet velocity v at the horizontal distance L2, and it can be obtained according to the triangle principle:

$$yt2=(L3-L2)*(y2-\overline{y_1})/(L2-L1)+y2 \quad (23)$$

Thus, the vertical deviation calculation method after the bullet flies the horizontal distance L3 is obtained:

$$y3=yt2*Y\_Coefficient+h*H\_Coefficient \quad (24)$$

and then the following formula can be obtained:

$$y3 = \left(\frac{(L3-L2)*(y2-\overline{y_1})}{L2-L1} + y2\right)*Y\_Coefficien+ \quad (25)$$
$$\left(\frac{(L3-L2)*(L3-L2)}{(L2-L1)*(L2-L1)}\right)*\left(y2-\frac{\overline{y_1}*L2}{L1}\right)*H\_Coefficient$$

In conclusion, according to the compensation fitting algorithm based on a shooting angle, the shortest distance point is selected for shooting from the built-in gun shooting parameter table, then horizontal and vertical mean deviations x and y are obtained, the calculation methods of x and y are worked out according to the sight principle, the horizontal and vertical deviations of the second distance in the gun shooting parameter table are calculated, the deviation values are stored, and the impact point under a random distance is calculated in combination with the gravitational deviation.

If finishing precise shooting, the photoelectric sighting system, for example, a shooting sighting mirror, needs to be calibrated after being installed. The impact points of subsequent shooting are calibrated according to the shooting deviations. The present invention provides a calibration method of the photoelectric sighting system according to the deviations calculated by using the above formulae, and the calibration method of the photoelectric sighting system includes: setting a distance deviation in a parameter table and calculating an actual shooting impact point according to the distance deviation in the parameter table. The setting a distance deviation in a parameter table particularly includes: presetting N shooting distances, performing a shooting calculation to obtain a deviation corresponding to each preset shooting distance, recording each shooting distance and the deviation corresponding to it in a shooting parameter table to finish the setting of the distance deviation in the parameter table; and the calculating an actual shooting impact point according to the distance deviation in the parameter table particularly includes: during actual shooting, determining a relationship between an actual shooting distance and each shooting distance built in the parameter table, and calculating a deviation of the actual shooting distance according to the shooting distance and the deviation built in the parameter table to realize the calibration of an impact point for the actual shooting distance. The method is particularly as follows.

The setting a distance deviation in a parameter table particularly includes:

recording N shooting distances within a gun shooting parameter table, performing corresponding calculations to obtain the deviations corresponding to the shooting distances in each parameter table to finish the setting of the distance deviation in the parameter table. Generally, two shooting distances and corresponding deviations are recorded in the parameter table, but the number of the shooting distances and the corresponding deviations is not limited to 2 and can be regulated according to an actual demand, preferably, is less than 10.

Two methods including traditional calibration and photographing calibration are provided for calculating the deviation corresponding to each shooting distance in the parameter table.

Traditional calibration

On one hand, shooting is performed many times for each shooting distance within the parameter table without considering an influence of a shooting angle factor to a shooting deviation, and coordinates of a target point and coordinates of an impact point are actually measured, an accumulation deviation (X, Y) of multiple times of shooting is calculated according to formulae (1) to (2), and a mean deviation $(\overline{x_i}, \overline{y_i})$ of n times of shooting is calculated in combination with formulae (3) to (4); and the mean deviation corresponding to each shooting distance is correspondingly entered into the parameter table.

On the other hand, shooting is performed many times for a certain shooting distance within the parameter table with considering an influence of a shooting angle factor to a shooting deviation, the coordinates of the target point and the coordinates of the impact point are actually measured, the accumulation deviation (X, Y) of multiple times of shooting is calculated according to the formulae (1) to (2), a mean deviation $(\overline{x_i}, \overline{y_i})$ of n times of shooting is calculated in combination with the formulae (3) to (4), and the mean deviation corresponding to the shooting distance is correspondingly entered into the parameter table; and the deviation (x, y) generated after considering the influence of the shooting angle is calculated for other shooting distances within the parameter table in combination with formulae (5) to (15), and the deviation corresponding to each shooting distance is correspondingly entered into the parameter table.

Photographing Calibration

The photographing calibration is different from the traditional calibration in a deviation measuring way. During shooting, the center of the cross division line corresponds to the target point. In the photographing calibration, the sighting mirror is started to photograph after the shooting is finished, the photographed image is displayed on a screen, at the moment, the center of the cross division line is moved to the impact point by regulating a key or a rotary encoder, respective moving distances of x and y are recorded and restored in real time in a moving process, and thus, the setting of the distance deviation in the parameter table is finished. The photographing calibration method may particularly refer to paragraphs [0105] to [0111] of the specification of US2017/0176139 A1.

The calculating an actual shooting impact point according to the distance deviation in the parameter table particularly includes:

in an actual shooting process, firstly, determining the shooting distance, inputting the determined shooting distance, and determining a relationship between the shooting distance and each distance built in the parameter table:

when the shooting distance is equal to a certain distance built in the parameter table, directly reading the deviation of the shooting distance, and calculating the impact point for the shooting distance;

when the actual shooting distance is between two shooting distances built in the parameter table, calculating the deviation of the shooting distance by using an equal-proportional calculation method, wherein the equal-proportional calculation method is as follows: if the shooting distance S is between the two built-in shooting distances $M_p$ and $M_q$, regarding the impact point for the distance S as being between a point p and a point q; a deviation of the shooting distance S is calculated in combination with formulae (16) to (17), and the impact point for the shooting distance is calculated; and when the shooting distance is beyond a range of the parameter table, reducing the precision of the equal-proportional calculation method, at the moment, requiring to consider influences brought by external factors, and calculating the deviation by using a multi-dimensional impact point deviation rectifying method to realize the calibration of the impact point for the shooting distance.

Among others, the multi-dimensional impact point deviation rectifying method includes, but is not limited to, a gravitational acceleration combined single-body impact point deviation rectifying method, a shooting pose based fitting method, a three-degree-of-freedom trajectory calculating method, a six-degree-of-freedom trajectory calculating method, and the like.

The gravitational acceleration combined single-body impact point deviation rectifying method is as follows: when the actual shooting distance is beyond a range of the parameter table, for example, due to a gravity factor, the deviation influenced by the gravity is calculated in combination with formulae (18) to (25).

The shooting pose based fitting method is as follows: the deviation influenced by a pitch angle is calculated in combination with formulae (5) to (20) in U.S. Ser. No. 15/353,074 on the basis of considering the influence of a shooting pose, for example, the pitch angle to the impact point.

The six-degree-of-freedom trajectory calculating method is as follows: the deviation influenced by the pitch angle is calculated by reference to paragraphs [0096] to [0101] of the specification of US2017/0176139 A1.

The calibration method provided by the present invention includes: performing trial shooting for a plurality of shooting distances in advance, actually measuring the deviation of the impact point and the target point under each preset shooting distance, entering the shooting distances and the corresponding deviations into the parameter table, determining the relationship between the actual shooting distance and each shooting distance built in the parameter table by using the sighting circuit unit in the subsequent actual shooting process, and when the actual shooting distance is just one of the built-in shooting distances, directly reading the deviation of the shooting distance, and calibrating the impact point for the actual shooting distance; when the actual shooting distance is between two built-in shooting distances, regarding the impact point as being between the impact points for the built-in shooting distances, and calculating the deviation of the actual shooting distance by using an equal-proportional calculation method according to the deviation of the two built-in shooting distances; and when the actual shooting distance is beyond a range of the built-in shooting distances, calculating the deviation by considering the influences of the gravity, a pose angle, six degrees of freedom or three degrees of freedom, and the like to a longitudinal displacement in the longitudinal direction. Meanwhile, trail shooting measurement for each preset shooting distance is not required in the process of finishing parameter table presetting, and it is feasible that the deviations of other shooting distances are calculated by considering the shooting angle after the measurement of the deviation of one shooting distance is finished. The calibration method provided by the present invention is simple, efficient and capable of automatically realizing the calibration of the impact point for subsequent shooting distances and improving the actual shooting precision.

Embodiment 2

The applied photoelectric sighting system is not limited to the structure described in the embodiment 1.

The field-of-view acquisition unit may be a day and night compatible lens, and the display unit may be an OLED display screen.

An exterior of a shell of the structure may be provided with a focusing knob or a handle-type focusing handwheel, an interior of the focusing knob or the handle-type focusing handwheel is connected with the day and night compatible lens, and the knob is artificially regulated according to the definition of an image under different distances, so that the image reaches the clearest state.

An appearance structure of the photoelectric sighting system is also not limited to the structure as shown in FIG. 1 to FIG. 4, and this embodiment provides another appearance structure of the photoelectric sighting system, which is as shown in FIG. 15 to FIG. 19. A sighting circuit unit in this embodiment is a master control CPU circuit.

Compared with the embodiment 1 in which the interface board is arranged at one side, deviated from the display unit, of the CPU core board, the embodiment is different in that the master control CPU circuit is arranged at one end, close to the day and night compatible lens, in an internal space of the shell.

A sensor of the photoelectric sighting system includes a low-illumination photoelectric conversion sensor, and the low-illumination photoelectric conversion sensor is arranged between the day and night compatible lens and the CPU core board.

The day and night compatible lens 011 is composed of a lens group, each lens in the lens group may enable 100% of common visible light to pass through under a daytime lighting condition and can guarantee that a passing rate of near infrared light reaches 95% under a nighttime infrared light supplementation condition so as to provide an enough light source for clear imaging of the low-illumination sensor. The low-illumination sensor refers to a sensor still capable of capturing a clear image under the condition of relatively low illumination, the illumination is expressed by Lux (Luxton), generally, low illumination is divided into a dark light level, a moonlight level and a starlight level in which illuminations are respectively 0.1 Lux, 0.01 Lux and 0.001 Lux, and the level of an electronic sighting mirror with low illumination in the present invention is the starlight level.

Figure 15:
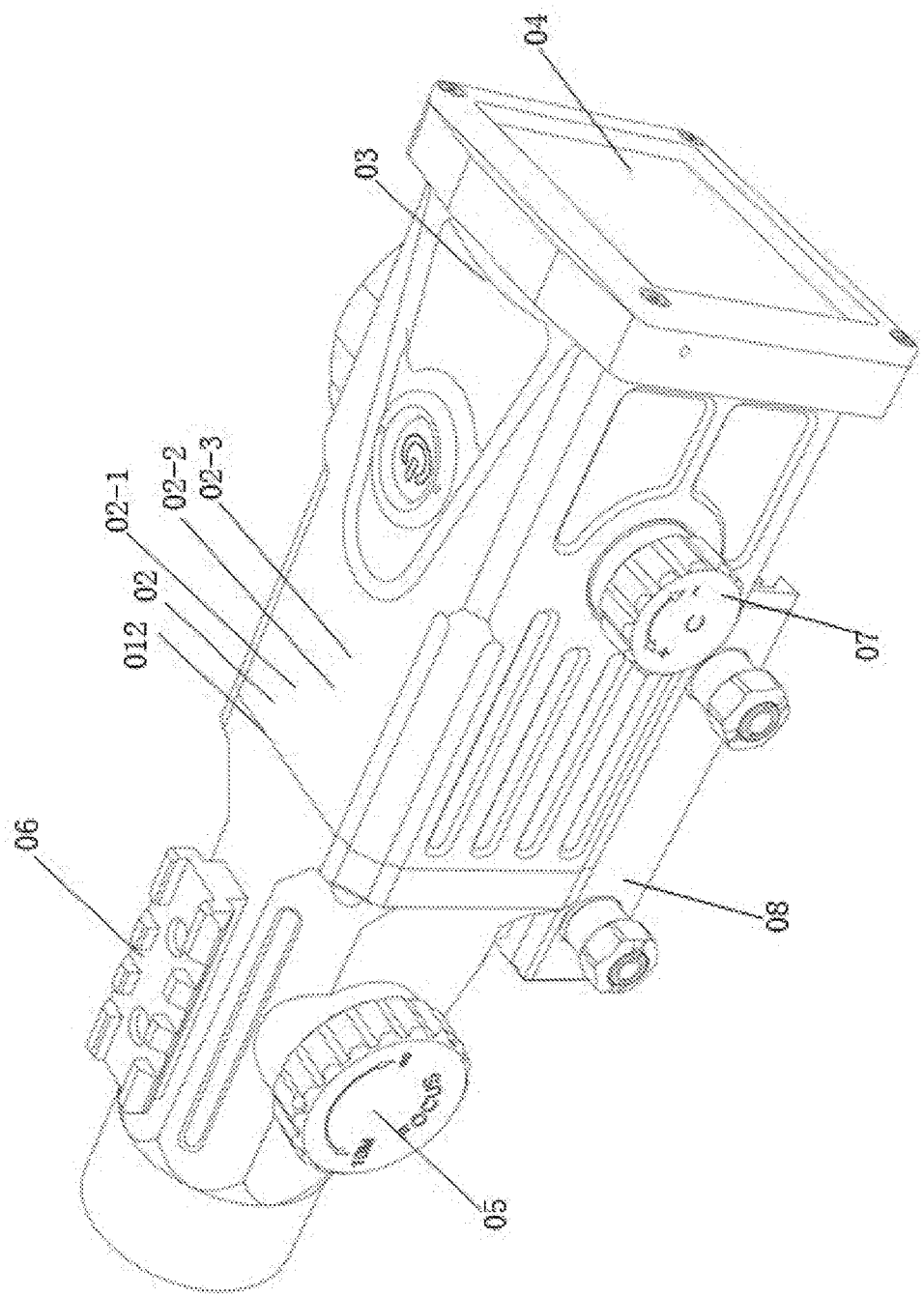
FIG. 15 is a rear-left view of a sighting mirror in a further embodiment of the present invention.

As shown in FIG. 15, this embodiment includes a low-illumination sensor circuit 01, wherein the low-illumination sensor circuit 01 is fixedly arranged inside the shell of the structure, arranged at the rear end of the day and night compatible lens 011 and coaxially connected with the day and night compatible lens 011; the low-illumination sensor circuit 01 is configured to directly convert target optical information into image information under a visible light condition; the sensor is configured to capture weak starlight under a low-illumination environment such as starlight to ensure that a target can still be imaged and displayed without replacing the sighting mirror or supplementing external light; a night vision mode is switched under a completely dark condition, the sighting mirror is not required to be replaced, the low-illumination sensor circuit 01 is matched with the day and night compatible lens 011, and infrared light supplementation is performed in the exterior, so that the target can be clearly imaged and displayed at high quality; compared with the traditional infrared night vision sighting mirror which is poor in imaging quality under the same infrared light supplementation condition, the low-illumination sensor circuit 01 can be used for forming a high-definition image without any noisy points; and as for outline imaging in imaging, the low-illumination sensor circuit 01 can be used for clearly distinguishing details of the target so as to provide a high-quality image for clearly distinguishing an object at the completely dark night. A day and night switching control unit is arranged between the low-illumination sensor circuit 01 and the day and night compatible lens 011, the day and night switching control unit is connected with the low-illumination sensor circuit 01 or a master control CPU circuit 02 by a connecting line and receives a command to control the switching of day vision and night vision modes, and a control command is sent by a user by operating a human-computer interactive operation knob 07.

The day and night switching control unit includes an optical filter driving mechanism, a coil and a magnet; the coil is connected with the master control CPU circuit or the low-illumination sensor circuit by two wiring terminals; the optical filter driving mechanism is connected with a visible light passing optical filter and an infrared light passing optical filter; and the optical fiber driving mechanism rotates to make the visible light passing optical filter or the infrared light passing optical filter be arranged between the day and night compatible lens and an optical path of the low-illumination sensor circuit. A day and night switching mode is selected by operating the human-computer interactive operation knob of the sighting mirror, the master control CPU circuit controls a flow direction of a current of the coil according to the selected mode, the current generates a magnetic field after passing through the coil, the direction of the magnetic field is decided by the flow direction of the current, and the magnetic field of the coil and the magnet generate a magnetic field acting force to control the movement of the magnet, so that the optical filter driving mechanism is driven to act to realize the switching of the optical filter, and therefore, the switching of the day vision mode and the night vision mode is realized.

As shown in FIG. 15, the master control CPU circuit 02 is fixedly arranged inside the shell of the structure and connected with the low-illumination sensor circuit 01 in a coaxial way, but not limited to the connecting way, the master control CPU circuit 02 is connected with the low-illumination sensor circuit 01 by a connecting line or a connecting terminal, the master control CPU circuit 02 is configured to acquire image data acquired by the low-illumination sensor circuit 01 in real time, perform real-time processing on the data and transmit the processed image data to the OLED display screen 04 in real time to perform image display so as to finish the real-time acquisition of the image, the master control CPU circuit 02 further includes external interfaces such as a serial port, an HDMI interface, an SD card interface and a USB interface, and the above interfaces are fixedly arranged in an external socket slot 111 of the shell.

Figure 19:
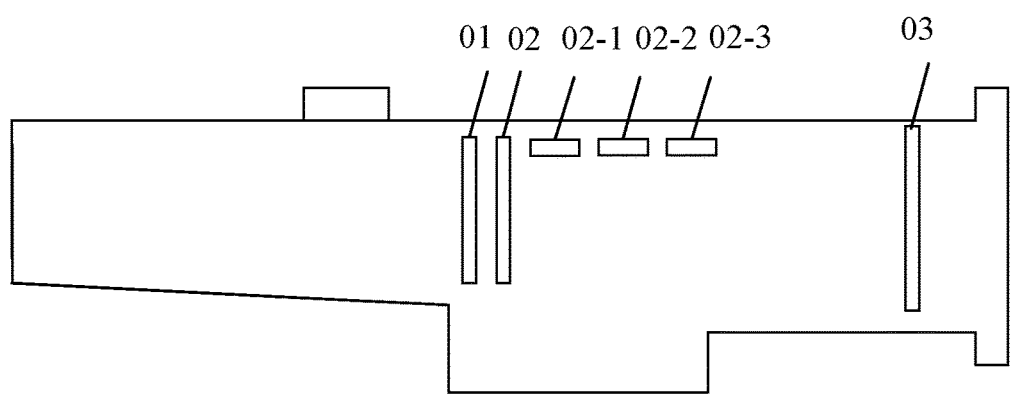
FIG. 19 a schematic view of the sighting mirror in a further embodiment of the present invention.

As shown in FIG. 15, FIG. 19, the wifi module 02-1 may be integrated into the master control CPU circuit 02 or be an independent modular circuit (for example, integrated on an interface board alone) connected with the master control CPU circuit 02 by adopting a connecting line and a connecting terminal, the wifi module 02-1 as the independent modular circuit is not limited to the above connecting way, a sighting mirror system may be set as a hotspot by the wifi module 02-1, an external mobile terminal is connected with the sighting mirror system by means of a wifi signal to transmit the data, and meanwhile, the wifi module 02-1 may also access an external wireless network, and is connected with a mobile terminal accessing the same wireless network to finish data transmission.

As shown in FIG. 15, FIG. 19, the GPS module 02-2 may be integrated into the master control CPU circuit 02 or be an independent modular circuit connected with the master control CPU circuit 02 by adopting a connecting line and a connecting terminal, the GPS module 02-2 as the independent modular circuit is not limited to the connecting way, the GPS module 02-2 can be configured to record the position of the current sighting mirror in real time and store the continuously changed position information in a file with a map format to finish a full path description, meanwhile, the real-time position information may be displayed in built-in map software in real time to mark the current position in real time to ensure that the current position may be more intuitively shown, and a place of interest may be artificially marked and is especially marked and displayed in the whole trajectory information so as to provide information patterned trajectory data for finding a specific place next time.

As shown in FIG. 15, FIG. 19, the Bluetooth module 02-3 may be integrated into the CPU circuit 02 or be an independent modular circuit connected with the master control CPU circuit 02 by adopting a connecting line and a connecting terminal, the Bluetooth module 02-3 as the independent modular circuit is not limited to the connecting way, and the Bluetooth module 02-3 is connected with the mobile terminal, so that contents such as simple data and commands may be rapidly and conveniently transmitted.

As shown in FIG. 15, the display screen adopts an OLED display screen 04 capable of realizing binocular viewing at the same time under a natural condition and better in display effect, but is not limited to the OLED display screen, and an OLED display technology has the advantages of self-illumination, wide viewing angle, almost infinitely-high contrast, relatively low power consumption, extremely high response speed, and the like. By using the OLED display screen capable of realizing binocular viewing at the same time, the problem of one-eye opening and one-eye closing caused by the traditional monocular sighting way is solved, fatigue brought by sighting is eliminated, meanwhile, the target may be effectively found and sighted by using the way of binocular viewing at the same time, and a stable target sighting way may be provided for shooting; and the OLED display screen 04 is fixedly arranged inside the shell of the structure of the sighting mirror, disposed at the rear end of the shell of the structure of the sighting mirror and connected with the master control CPU circuit 02 by a display switching circuit 03 or directly connected with the master control CPU circuit 02, the connection way adopts a connecting line, but is not limited to the connecting line, the OLED display screen 04 is configured to receive image frame data transmitted by the master control CPU circuit 02, display continuous frame information in real time and also receive human-computer interactive interface information transmitted by the master control CPU circuit 02, and the human-computer interactive interface information and the image frame data are displayed in a superimposing manner, so that information of a sighting mirror system is displayed in real time.

As shown in FIG. 15, the display switching circuit 03 is fixedly arranged inside the shell of the structure of the sighting mirror and configured to convert a format of the data transmitted by the master control CPU circuit 02 into a data format which can be identified and displayed by the OLED display screen 04.

Figure 16:
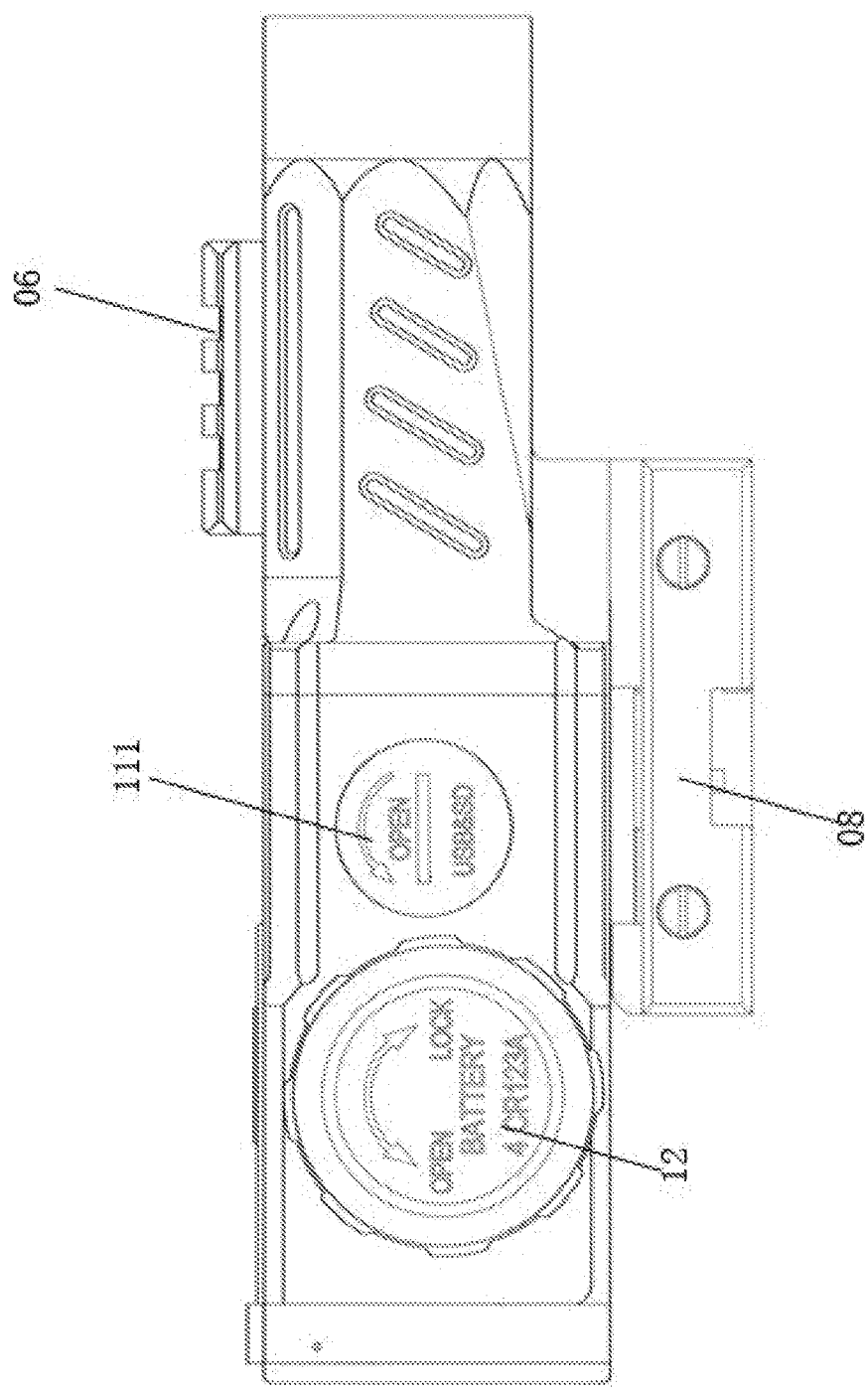
FIG. 16 is a right view of the sighting mirror in a further embodiment of the present invention.
Figure 17:
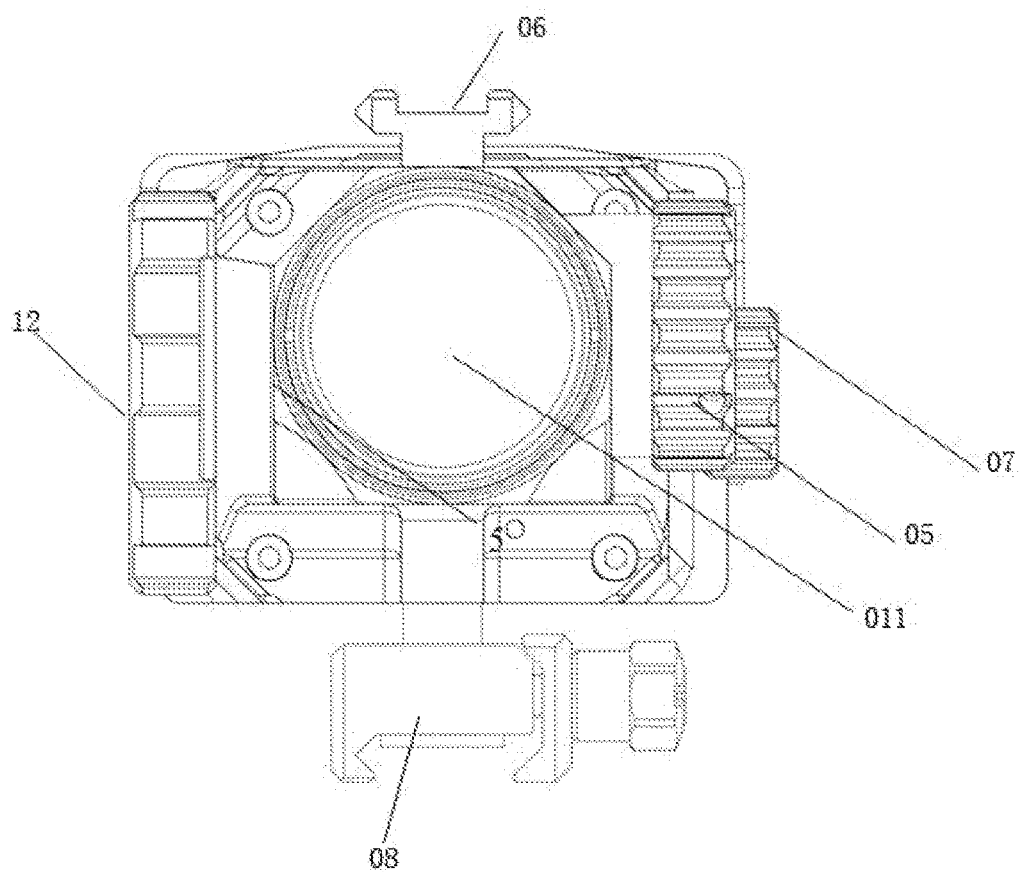
FIG. 17 is a front view of the sighting mirror in a further embodiment of the present invention.
Figure 18:
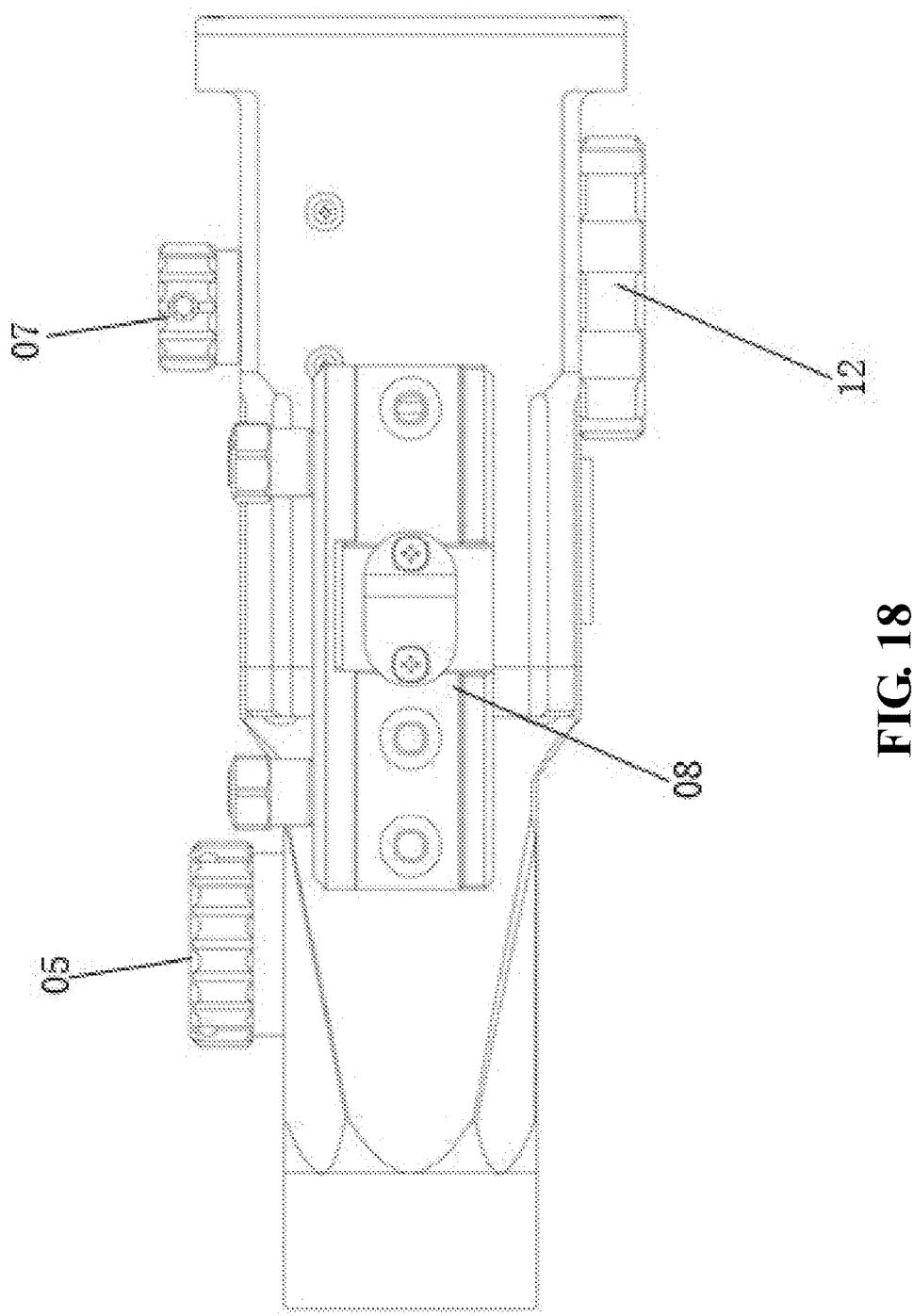
FIG. 18 is a bottom view of the sighting mirror in a further embodiment of the present invention.

As shown in FIG. 16 and FIG. 17, the battery compartment 12 is fixedly arranged inside the shell of the structure of the sighting mirror, and connected with the above circuits for providing power sources for driving all the circuits.

As shown in FIG. 15 and FIG. 17, the focusing knob 05 is fixedly arranged outside the shell of the structure of the sighting mirror, the interior of the focusing knob 05 is connected with the day and night compatible lens 011, and the focusing knob is artificially regulated according to the definition of the image under different distances, so that the image reaches the clearest state.

As shown in FIG. 15 to FIG. 17, the external device fixing seat 06 is fixedly arranged outside the shell of the structure of the sighting mirror and takes charge of being externally connected with external devices including, but not limited to, a light supplementation lamp and a laser range finder, and when the sighting mirror is used at night, the external device fixing seat 06 is externally connected with the infrared light supplementation lamp to provide an external light source for clear display of the sighting mirror.

As shown in FIG. 15, FIG. 16 and FIG. 17, the human-computer interactive operation knob 07 is fixedly arranged outside the shell of the structure of the sighting mirror, the interior of the human-computer interactive operation knob 07 is connected with the master control CPU circuit 02 by a connecting line, the connecting way is not limited to the connecting line, the human-computer interactive operation knob 07 takes charges of receiving and responding an operation of an operator, and the master control CPU circuit 02 executes and responds to a corresponding action according to the input of the operation, so that the use aim of an operator is achieved.

As shown in FIG. 15-FIG. 17, the sighting mirror fixing base 08 is fixedly arranged at the bottom of the shell of the structure of the sighting mirror and is of an elastic design so as to adapt to connecting parts of different guns.

As shown in FIG. 16, the external socket slot 111 is arranged at the side of the shell of the structure of sighting mirror and includes a serial port, a SD card interface, a USB interface and a HDMI interface.

Since the low-illumination sensor has stronger sensitivity to light, it may finish imaging under the condition of weak light such as starlight and moonlight, an OLED display way is selected in order to ensure that the image of the low-illumination sensor in different light environments is displayed more clearly and truly, and compared with LCD display, the OLED display has the following advantages:

size and thickness: a pixel of an LCD cannot emit light and can emit light by adding a backlight layer, while each pixel of an OLED can emit light without additionally adding a backlight layer, and therefore, the thickness of the OLED is smaller than that of the LCD under the same condition;

black level: the black level refers to what extent a picture is "black" when the picture is displayed in the deepest color. The LCD depends on filtration or shielding of the visible light, and therefore, it is very difficult to display the true black, and furthermore, an LCD screen cannot bring true black at all. However, the OLED may bring the true black due to a self-luminescence principle provided a light emitting mechanism is disenabled;

contrast: the contrast refers to a difference between the brightest white and the deepest black, the brightness of the LCD may be regulated to be higher by the backlight, but the true black cannot be obtained, while the OLED owns the deepest black, and the OLED display screen generally owns a higher contrast due to the advantage of the black level; and color uniformity: whether various colors can be displayed on one plane in a unified way or not is a very important index for measuring the color uniformity. The backlight of the LCD screen is generally from an edge, so that the LCD screen is relatively common in irradiation uniformity; and each pixel of the OLED can emit light, so that light source diffusion is not required, and the color uniformity is guaranteed.

Meanwhile, the photoelectric sighting system provided in this embodiment further has the following functions:

1. the display unit of the photoelectric sighting system may be divided into two display regions, wherein the two display regions simultaneously display images/videos of target regions, however, when an amplification proportion is changed, the image/video of one of the display regions is changed along with the change of the amplification proportion, the image/video of the other display region is not changed along with the change of the amplification proportion, and the image with the original proportion is limited all the time, so that it is convenient to the user to perform whole observation and local observation, and the aim of combination of conveniently finding the target and clearly observing the target is achieved.

2. A distance estimation icon is built in the photoelectric sighting system. Its principle is as follows: heights of various animals are built in the distance estimation icon and are based on a mean height of this kind of animals, and the distance of a target animal is estimated by dense point measurement.

3. The photoelectric sighting system can be used for automatically storing pictures displayed within a seconds (s) before shooting and b seconds (s) after shooting, wherein the ranges of the a and the b can be set. Its principle is as follows: the system stores a video within the time duration a seconds (s) before shooting in real time according to a moment that the shooting is detected by a built-in sensor, when the time duration exceeds a seconds (s), a video frame earliest in the time duration a seconds (s) is removed, a new video frame is added to ensure that the video content within the time duration a seconds (s) is the latest video content, when the shooting is detected, a video within the time duration b seconds (s) is acquired and stored by taking the current moment as the reference, the videos within the time duration a seconds (s) and the time duration b seconds (s) are mixed to obtain a finished video of contents within the time duration a seconds (s) before shooting and the time duration b seconds (s) after shooting.

4. The photoelectric sighting system further includes a thermal imaging lens.

Embodiment 3

Figure 20:
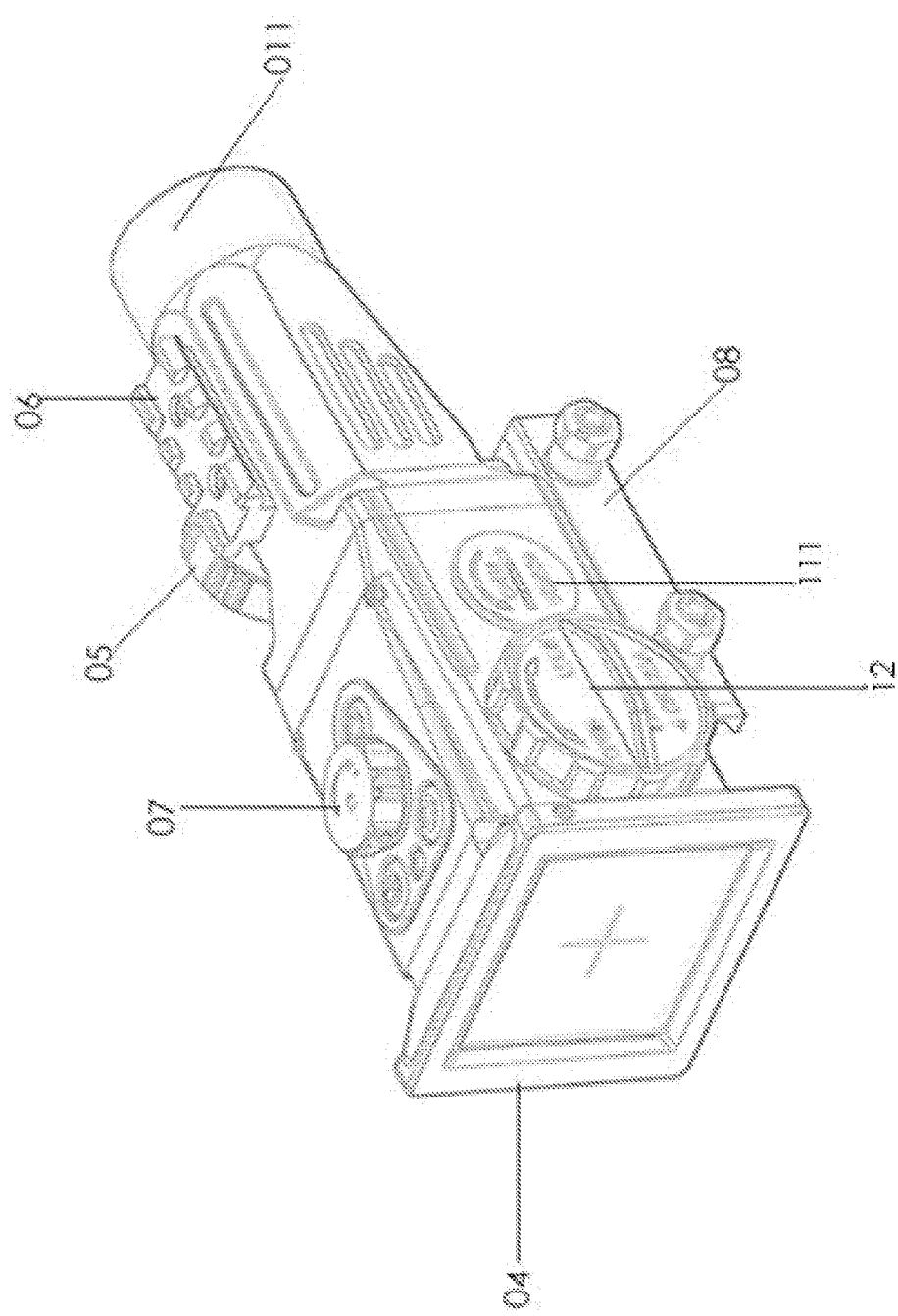
FIG. 20 is a stereoscopic schematic diagram of the sighting mirror in a further embodiment of the present invention.

Meanwhile, the appearance of the photoelectric sighting system is not limited to the above and may also be shown as FIG. 20; tow ends of the shell are respectively provided with a lens 04 and a display unit 011; a base 08 is arranged below the shell to facilitate installing the shell on a gun or other arrangements; the side of the shell is provided with a focusing knob 05, a battery compartment 12 and a USB compartment; a human-computer interactive operation knob 07, a power switch key, and the like are arranged on positions, close to the display unit, above the shell, wherein the human-computer interactive operation knob 07 integrates various functions, each functional menu displayed by the display unit may be switched by rotating the human-computer interactive operation knob 07, and the determination of the currently selected function of the display unit may be realized by pressing the human-computer interactive operation knob 07.

The human-computer interactive operation knob 07 includes two parts including a button and a key, the key is clicked to make an editable content region enter an editing state and realize function selection and determination in a menu interface; the key is pressed for a long term to pop up/hide the menu interface, pop up/hide a screen brightness regulating interface and pop up an action execution interface; and the button is rotated to switch options or increase, decrease or switch editing option data.

An external device fixing seat 06 is arranged on a position, close to the lens, above the shell.

An interior of the shell is provided with a circuit board including a master control module and a low-illumination sensor module, wherein the low-illumination sensor module is connected with the master control module, and the master control module is connected with the display unit; and the master control module and the low-illumination sensor module may be arranged on the same circuit board, or the master control module and the low-illumination sensor module are respectively arranged on different circuit boards. A day and night switching control unit is arranged between the low-illumination sensor module and the lens.

A main interface of the display unit may display a plurality of states; after the sighting mirror system is started, a default rate of the main interface of the display unit is in an opt-in state under which the button of the human-computer interactive operation knob 07 is rotated to enter a switching mode so as to be switched into other states, and functions under all the states are shown as Table 1.

TABLE 1

Display States of Main Interface of Display Unit and Functions of Display States

| Serial Number | Name of State | Functions |
|---|---|---|
| 1 | Rate | The key of the human-computer interactive operation knob 07 is clicked under a rate state to enter a rate editing mode, and an amplified or reduced rate value is displayed on the main interface in a rate editing mode process. |
| 2 | Distance | A current target distance is edited and displayed. |
| 3 | Trajectory Compensation in Horizontal Direction | Horizontal trajectory compensation under the current distance is edited and displayed. |

TABLE 1-continued

Display States of Main Interface of Display Unit and Functions of Display States

| Serial Number | Name of State | Functions |
|---|---|---|
| 4 | Trajectory Compensation in Vertical Direction | Vertical trajectory compensation under the current distance is edited and displayed. |
| 5 | Template Creation | The key is clicked under this state to create a template parameter required by impact point identification, and the sighting mirror automatically quits this mode no matter a template is created successfully or not. |
| 6 | Automatic Identification of Impact Point | The key is clicked under this state to enter a mode of automatically identifying and calculating the position of the impact point, the sighting mirror reminds a user of an identification failure and automatically quits this mode when the identification is failed, the identified and calculated final position information of the impact point is displayed after the identification is successful, the user may select "Accept" or "Ignor", a trajectory deviation is modified when Accept is selected, and the mode is quitted when Ignor is selected. |
| 7 | Scale of Pitch Angle | A scale of a pose pitch angle is displayed. |
| 8 | Scale of Rolling Angle | A scale of a pose rolling angle is displayed. |
| 9 | Numerical Value of Pitch Angle | A numerical value of the pose pitch angle is displayed. |
| 10 | Numerical Value of Rolling Angle | A numerical value of the pose rolling angle is displayed. |
| 11 | Type of Bullet | A type of a currently-used bullet is displayed. |
| 12 | Video Indication Identification | Whether an identification region of the video is started or not. |
| 13 | Time Display | Accumulated time of the video is displayed during video recording, and real-time time of a current time zone is displayed in a video stopping state. |
| 14 | Wifi Identification | / |
| 15 | SD Card Identification | An identification region for plugging or unplugging an SD card is shown. |
| 16 | GPS | / |
| 17 | Battery Capacity | A current residual capacity of a battery within the battery compartment is displayed. |

The key is pressed for a long term under the mode of the main interface to enter menu function selection and is released after the menu interface is displayed, at the moment, the menu is regarded to be in a cross division line selection state by default under which the key is clicked to enter cross division line setting, and the button is rotated to switch the menu.

The menu function selection includes a plurality of sub-states, sub-options are selected by rotating the button of the human-computer interactive operation knob 07, and functions under all the sub-states may be realized by operating the human-computer interactive operation knob 07.

A list of the sub-states and the functions included in menu functions is shown as Table 2.

TABLE 2

List of Sub-states and Functions Included in Menu Functions

| Sub-states | Functions |
|---|---|
| Cross Division Line Setting | The key of the human-computer interactive operation knob 07 is clicked to pop up a cross division line setting interface, and a cross division line to be used is selected by rotating the button of the human-computer interactive operation knob 07. |
| Horizontal Initial Leveling | The key of the human-computer interactive operation knob 07 is clicked to enter a horizontal initial leveling mode under which a position of the cross division line in a horizontal direction is regulated by the button, and after the regulation is completed, the key of the human-computer interactive operation knob 07 is clicked again to quit the horizontal initial leveling mode. |
| Vertical Initial Leveling | The key of the human-computer interactive operation knob 07 is clicked to enter a vertical initial leveling mode under which a position of the cross division line in a vertical direction is regulated by the button, and after the regulation is completed, the key of the human-computer interactive operation knob 07 is clicked again to quit the vertical initial leveling mode. |
| Factory Setting Restoration | The key of the human-computer interactive operation knob 07 is clicked to restore all data to be in a factory state. |

TABLE 2-continued

List of Sub-states and Functions Included in Menu Functions

| Sub-states | Functions |
| --- | --- |
| Type-of-Bullet Entering | The key of the human-computer interactive operation knob 07 is clicked to enter a type-of-bullet entering interface, and a setting of the type of the bullet is selected, edited and defined by rotating the button of the human-computer interactive operation knob 07. |
| System Setting | The key of the human-computer interactive operation knob 07 is clicked to enter a system setting interface, and system time, a remaining margin alarm threshold, a remaining margin displaying way, an SD card storage margin alarm threshold, an SD card storage margin displaying way and a screen brightness are set by rotating the button of the human-computer interactive operation knob 07. |
| Day and Night Switching | The key of the human-computer interactive operation knob 07 is clicked to switch a day and night use mode. |

Among others, the trajectory parameter supports an expression form of seven numbers and four symbols to the maximum extent under a type-of-bullet entering mode, the numbers ranges from 0 to 9, the four symbols are "-", "/", "." and "x", the button is rotated to move to a horizontal line region where the parameter is required to be input, when a certain horizontal line region is selected, a horizontal line is switched to be red, other horizontal lines are switched to be white, the key of the knob is clicked to enter a selection and edit state, at the moment, the red horizontal line will be flickering, the button is rotated, a region above the horizontal line is switched to display a numeral value to be selected, the key of the knob is clicked for determination after the selection is completed, the above steps are repeated to selectively input the next parameter, after the input of a trajectory required to be set is completed, the button is rotated to move to a position "Input", the key of the knob is clicked, the trajectory is set, the key directly returns to the main interface, the knob is moved to a position "Quit" to give up the setting, and returns to the main interface, for example, the type of the bullet is set as "223" or "30-06", the button is regulated to select a typeface "223" or "30-06" above the horizontal line region where the parameter is input, "Input" is clicked to complete the setting of the type of the bullet, and the type of the bullet is displayed in the main interface after the setting is completed and the key returns to the main interface. The photoelectric sighting system provided by the present invention may realize switching input of all the functions under a primary menu and avoid problems of function finding complexity and long time consumption for a multilevel menu in the prior art; the display unit simultaneously displays a target original proportional picture and a zoomed picture so as to provide convenience for the user to find the target; a trajectory input mode meets the requirement of input of various types of bullets, so that the application range is broad; the photoelectric sighting system is internally provided with an optical distance estimator for assisting the user to estimate a target distance; meanwhile, the photoelectric sighting system includes the thermal imaging lens by which the target is observed at night; and the day and night switching mode of the lens meets the requirement for use in the daytime and at night. A calibration system provided by the present invention assists the user in realizing rapid calibration by a built-in parameter table and a built-in algorithm.

The invention claimed is:

1. A photoelectric sighting system, comprising:
   a shell having an internal space, a shell front end, and a shell rear end;
   a field-of-view acquisition unit installed at the shell front end;
   a display unit installed at the shell rear end; and a sighting circuit unit disposed in the internal space and connected to the field-of-view acquisition unit and the display unit, wherein the sighting circuit unit transmits information acquired by the field-of-view acquisition unit to the display unit;
   a low-illumination photoelectric conversion sensor disposed in the internal space and between the field-of-view acquisition unit and the sighting circuit unit, wherein the field-of-view acquisition unit comprises a day and night compatible lens group; and
   a day and night switching control unit that is disposed between the low-illumination photoelectric conversion sensor and the day and night compatible lens group, wherein the day and night switching control unit comprises an optical filter, an optical filter driving mechanism, a coil, and a magnet.

2. The photoelectric sighting system according to claim 1, wherein the display unit is an OLED display.

3. The photoelectric sighting system according to claim 1, wherein the exterior of the shell is provided with a focusing knob or a handle-type focusing handwheel, the focusing knob or the handle-type focusing handwheel is connected with the day and night compatible lens group, and the knob or the handwheel is regulated according to the definition of an image under different distances, so that the image reaches the clearest state.

4. The photoelectric sighting system according to claim 1, further comprising a master control CPU circuit that controls a flow direction of a current in the coil so as to generate a magnetic field, wherein the magnetic field control the magnet that drives the optical filter driving mechanism to allow visible light to pass the optical filter in a day vision mode or to allow infrared to pass the optical filter in a night vision mode.

5. The photoelectric sighting system according to claim 1, further comprising a human-computer interactive operation knob arranged on the shell, the human-computer interactive operation knob is connected with the master control CPU circuit, and the human-computer interactive operation knob rotates to make the master control CPU circuit control the flow direction of the current of the coil according to a selected daylight or nightlight mode.

6. The photoelectric sighting system according to claim 1, wherein each lens in the lens group allows 95% to 100% of visible light to pass through and allows 90% to 95% of near infrared light to pass through.

* * * * *